(12) United States Patent
Myers et al.

(10) Patent No.: US 9,317,496 B2
(45) Date of Patent: Apr. 19, 2016

(54) WORKFLOW SYSTEM AND METHOD FOR CREATING, DISTRIBUTING AND PUBLISHING CONTENT

(75) Inventors: Nolan Shea Myers, San Francisco, CA (US); Robert Benjamin Scott, San Francisco, CA (US); Bradley Keith Neuberg, San Francisco, CA (US); Huan Zhao, San Francisco, CA (US); Robert Cromwell, San Francisco, CA (US); Arthur Kopatsy, San Francisco, CA (US); Bradford Vogel, San Francisco, CA (US); Kerryck Jones, Guelph (CA); Kenneth Lorenz Knowles, Berkeley, CA (US); Joshua John Forman, San Francisco, CA (US)

(73) Assignee: Inkling Systems, Inc., San Francisco, CA (US)

( * ) Notice: Subject to any disclaimer, the term of this patent is extended or adjusted under 35 U.S.C. 154(b) by 348 days.

(21) Appl. No.: 13/353,180

(22) Filed: Jan. 18, 2012

(65) Prior Publication Data

US 2013/0019028 A1    Jan. 17, 2013

Related U.S. Application Data

(60) Provisional application No. 61/506,990, filed on Jul. 12, 2011.

(51) Int. Cl.
*G06F 15/16* (2006.01)
*G06F 17/24* (2006.01)
*G06F 17/22* (2006.01)
*G06Q 10/06* (2012.01)
*G06Q 10/10* (2012.01)

(52) U.S. Cl.
CPC .......... *G06F 17/248* (2013.01); *G06F 17/2235* (2013.01); *G06F 17/2288* (2013.01); *G06F 17/241* (2013.01); *G06Q 10/06311* (2013.01); *G06Q 10/103* (2013.01)

(58) Field of Classification Search
CPC .......... G06F 17/241; G06Q 10/06311; G06Q 10/103
USPC .......................................................... 709/246
See application file for complete search history.

(56) References Cited

U.S. PATENT DOCUMENTS

| | | | |
|---|---|---|---|
| 7,630,281 B2 * | 12/2009 | Takahashi et al. | 369/47.14 |
| 8,122,367 B2 * | 2/2012 | Krieger et al. | 715/764 |
| 2002/0107883 A1 * | 8/2002 | Schneid | 707/501.1 |
| 2007/0245018 A1 * | 10/2007 | Bhola et al. | 709/225 |
| 2009/0125413 A1 * | 5/2009 | Le Chevalier et al. | 705/26 |
| 2009/0259681 A1 * | 10/2009 | Lubbers et al. | 707/102 |
| 2011/0099071 A1 * | 4/2011 | Johnson | 705/14.64 |
| 2012/0030251 A1 * | 2/2012 | Alfredson | 707/803 |
| 2013/0073957 A1 * | 3/2013 | DiGiantomasso et al. | 715/705 |

* cited by examiner

*Primary Examiner* — Phuoc Nguyen
(74) *Attorney, Agent, or Firm* — Ascenda Law Group, PC

(57) ABSTRACT

Disclosed in some examples are systems, methods and machine readable media for the management of content creation. In some examples the system includes a content management component configured to store portions of an electronic content work and to implement version control of the electronic content work; a defect tracking component configured to store a defect record related to a stored portion of the electronic content work; a publication pipeline component configured to format the electronic content work for publication; and a integration component configured to present a graphical user interface which allows for editing the stored portions of the electronic content work, editing the defect record, and instructing the publication pipeline to format the electronic content work for publication.

17 Claims, 12 Drawing Sheets

FIG. 8

| | Sample Electronic Work Title | | Links Validation #117<br>May 10, 2011, 10:32pm | 11 Errors  24 Warnings  112 Infos — 8030 | | | | R229 (Now) ▽ |
|---|---|---|---|---|---|---|---|---|
| | | | LINK | STATUS | LINK TEXT | LINK TYPE | DESTINATION | LINK TEXT | FIELD Y |
| CONTENT | | | ▷ chapter 01 | ERROR | Multiple | Multiple | Multiple | Multiple | Multiple |
| FETCH | | | ▽ chapter 02 | INFO | Multiple | Multiple | Multiple | Multiple | Multiple |
| REPORTS | | | ch02_apendix_A.html, L:32-C:23 | ERROR | p.39 | <Sup> | ch02_apendix_A.html, L:32-C:23 | p.39 | ch02_apendix_A |
| SCHEMA | 2 | 11 | ch02_apendix_A.html, L:84-C:15 | | p.41 | <A> | ch02_apendix_A.html, L:84-C:15 | p.41 | ch02_apendix_A |
| IMAGES | 0 | 3 | ch02_apendix_A.html, L:123-C:2 | | Chaper 3 | <Sup> | ch02_apendix_A.html, L:123-C:2 | Chaper 3 | ch02_apendix_A |
| LINKS | 11 | 24 | ch02_apendix_A.html, L:173-C:86 | | Figure A.1 | <A> | ch02_apendix_A.html, L:173-C:86 | Figure A.1 | ch02_apendix_A |
| TOC | 5 | 23 | ch02_section01_A.html, L:32-C:23 | INFO | p.39 | <A> | ch02_section01_A.html, L:32-C:23 | p.39 | ch02_section01 |
| DOCTYPE | 0 | 0 | ch02_section01_A.html, L:84-C:15 | WARNING | p.41 | <A> | ch02_section01_A.html, L:84-C:15 | p.41 | ch02_section01 |
| ID | 5 | 10 | ch02_section01_A.html, L:123-C:2 | WARNING | Chaper 3 | <A> | ch02_section01_A.html, L:123-C:2 | Chaper 3 | ch02_section01 |
| FILENAMES | 3 | 8 | ch02_section01_A.html, L:173-C:86 | ERROR | Figure A.1 | <A> | ch02_section01_A.html, L:173-C:86 | Figure A.1 | ch02_section01 |
| CSS | 0 | 0 | ch02_section01_A.html, L:56-C:223 | | | <A> | ch02_section01_A.html, L:56-C:223 | | ch02_section01 |
| HEADERS | 0 | 0 | | | | | | | |
| DEFS | 0 | 0 | | | | | | | |

WORKFLOW SYSTEM AND METHOD FOR CREATING, DISTRIBUTING AND PUBLISHING CONTENT

CLAIM OF PRIORITY

This patent application claims the benefit of priority, under 35 U.S.C. Section 119(e), to U.S. Provisional Patent Application Ser. No. 61/506,990, entitled "WORKFLOW SYSTEM AND METHOD FOR CREATING, DISTRIBUTING AND PUBLISHING CONTENT," filed on Jul. 12, 2011, which is hereby incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Inkling Systems, Inc., All Rights Reserved.

BACKGROUND

Development of traditional print media and other rich content (e.g., textbooks, travel books, magazines, cookbooks, how-to books, literature, and the like) may be a challenging and complicated process often involving many authors, editors, proofers, illustrators, artists and other contributors. Tasks included in developing this content may include assembling a rough draft of the content from one or more author contributions, managing edits made by editors, and managing the publication process.

Content publishers face numerous challenges in achieving these tasks. For example, the various contributors may be spread out over a large geographical area and thus publishers may be faced with having to assimilate the contributions from each of these dispersed contributors. In some cases, different users may use different document formats (e.g., authors may use a word processing format such as MICROSOFT WORD®'s document format while proofers may work with Adobe's Portable Document Format (.PDF).) Publishers are thus faced with the challenge of converting amongst the various formats and propagating changes in one format to all of the different formats used by the various contributors. Oftentimes this is a manual task. Publishers may also struggle to properly track and manage the various versions and revisions of the content, communicate and track problems in the content, and track the resolution of such problems. Publishers also rely almost entirely on manual proofing which can be labor intensive. These challenges are only exacerbated when the content moves from traditional print media to electronic content, as new media types such as animations, videos, interactive quizzes and the like do not easily fit into existing processes or work with existing publishing tools.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 8 shows a graphical user interface, according to some examples of the present disclosure.

DETAILED DESCRIPTION

Figure 1A:
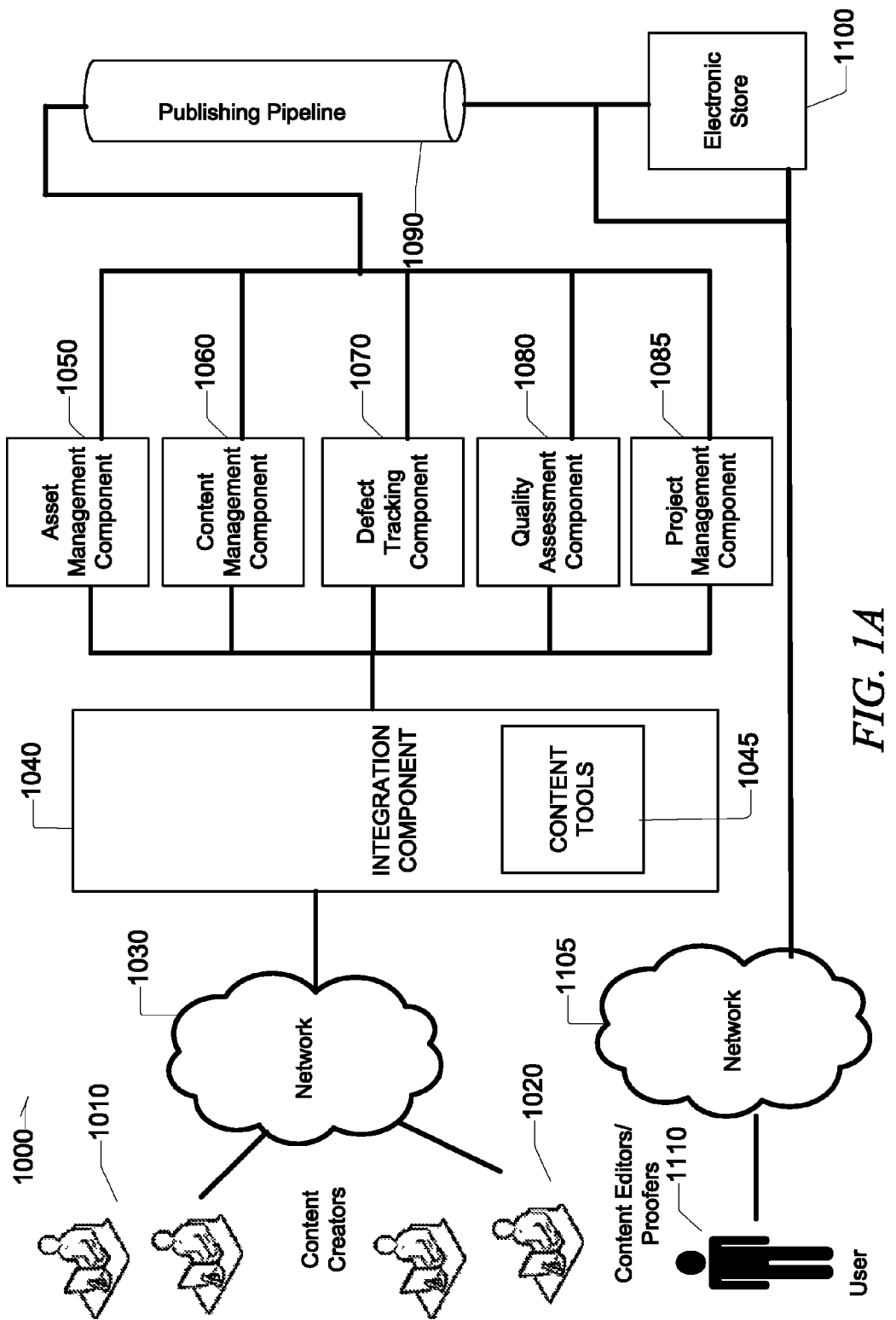
FIG. 1A shows a schematic of a publisher system, according to some examples of the present disclosure.

Disclosed in some examples are systems, methods, and machine-readable media for electronic management of the creation, editing, publication, and distribution of electronic content. The publication process may be managed by various contributors through an integration component which may integrate the functionality of one or more other components, coordinate various activities between components, may provide a front end interface for users of the system which may integrate data from one or more of these components for presentation to the user, and may provide various content editing and creation tools. The system may also include an asset management component that allows for authors, illustrators, animators, and the like to submit, manage, and assemble contributions to an electronic content work. In some examples, the system may include a content management component that may manage the electronic work once it has been assembled from the various submitted content portions. The system may also include a defect tracking component to store information on, and manage the lifecycle of, defects identified in the work. The defect tracking component may include defect identification, defect tracking, defect assignment to a particular editor or other user, and defect correction mechanisms that allow editors or other users to correct identified defects. In some examples, the defect management may be done at the issue level, rather than at the traditional document level. This may prevent a small subset of problem issues from holding up progress on other issues by allowing one editor to fix their problems in the master copy without regard to whether those assigned to other editors remain open. In yet other examples, the system may contain a quality assessment tool which can be used to automatically find defects, which may then be entered into the defect tracking component for assignment, tracking, and correction. The system may also have publication tools to publish and distribute the electronic content to one or more electronic platforms or to prepare the electronic content for publication in a traditional format (e.g., book format). Publication may include posting the electronic content in an electronic repository where it may be downloaded by end users. In other examples, publication may also include "pushing" an update to the electronic content to users who have already purchased an earlier version of the electronic content. Publication may also include converting the electronic content work into an electronic format suitable for traditional publication in paper form. The system may also have project management tools which allow users to manage the creation of multiple electronic content works at the same time by setting and managing phases, deliverables and other milestones.

In some examples, the process of electronic management of the creation, editing, and publication of electronic content may be managed by, and made available and accessible to, the content contributors through the use of the front end interface provided by the integration component. The integration component allows contributors to interact with the various components through a network-based user interface. Additionally, the integration component may coordinate the various other components of the system so as to perform the various operations of the system.

The various components may allow for collaboration where multiple contributors may work on the electronic content simultaneously. The system may include mechanisms to support allowing multiple contributors to work on the content simultaneously including content merge tools. These merge tools may facilitate the merging of contributions from various content creators, editors and other contributors. In some examples, the system may include mechanisms for automatically merging the contributions.

A contributor to the electronic content may include any individual who submits a contribution to the electronic work and may include editors, proofers, publishers, authors, copyeditors, or the like. While the specification may refer to specific types of contributors (e.g., proofers, editors, etc . . . ) performing various tasks and using the system in various ways, it will be appreciated by one skilled in the art with the benefit of Applicants' disclosure that the particular task and/or use of the system may not be limited to only the described type of contributor(s) but may be performed by any contributor.

Electronic content may contain information, experiences, and idea expressions that provide value for an end user. In some examples, the electronic content may be educational, recreational, informative, and/or used to advertise. The ideas and expressions of the electronic content may be conveyed to a user through the use of one or more text, graphic, audio, visual, and/or audiovisual elements. In some examples, the electronic content may include electronic textbooks, electronic pamphlets, electronic workbooks, electronic documents, e-books, and the like. In some examples, the electronic content may not be a complete work, but may be portions of a work. Electronic content may be stored according to any number of or combination of electronic formats including markup language files (extensible markup language (XML), hypertext markup language (HTML), Portable Document Format (.PDF), ePub (electronic publication—a free and open e-book standard by the International Digital Publishing Forum), Cascading Style Sheets (CSS), and the like), graphics interchange format (GIF), portable network graphics (PNG), joint photographic experts group format (JPEG), exchangeable image file format (EXIF), tagged image file format (TIFF), raw format, bitmap (bmp), scalable vector graphics (SVG), postscript (PS), portable document format (PDF), Shockwave flash (SWF), Waveform Audio File Format (WAV) format, Motion Picture Experts Group (MPEG) I, II, III, IV, Apple lossless (m4a), and the like. An electronic content work may be one or more pieces, or "portions" of electronic content which may be organized into a coherent whole. The term electronic content may be used to refer to both a portion of an electronic content work, or the electronic content work itself.

Turning now to FIG. 1A, an example system 1000 is shown. The various components of the system 1000 may be connected to each other directly or through a network. For example, one or more content creators 1010 and one or more content editors 1020 or other contributors may utilize computing device to simultaneously interface with the system 1000 through network 1030. Network 1030 may include any electronic network that allows content creators 1010 and content editors 1020 to access the components of the system 1000. For example, one or more portions of network 1030, or network 1105 (which may be the same or different network as network 1030) may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks, or the like. While certain components of FIG. 1A may be shown as directly connected, they may also be connected through a network, such as a network which may be the same or similar to networks 1030 and 1105. For example, asset management component 1050, content management component 1060, defect tracking component 1070, quality assessment component 1080, project management component 1085, publishing pipeline 1090, electronic store 1100, and integration component 1040 may be connected directly, through a network, or through a combination of direct or network connections. Furthermore, while each component is logically separated from the other components for convenient description, it will be appreciated by one skilled in the art with the benefit of Applicants' disclosure that some or all of the functionality of one component may be performed by a different component.

Integration component 1040 may be a network-addressable component which may provide a user interface that allows contributors, including content creators 1010 and content editors 1020, to interface with the rest of the system. In some examples, the interface may be a graphical user interface (GUI) that may allow content creators 1010 and content editors 1020 or other contributors to create, edit, merge, publish, open defects on, generate quality reports about, and manage various portions of the electronic content. Integration component 1040 may allow multiple contributors to access the same components, or even the same content portions, at the same time. Integration component 1040 may also implement one or more access controls that enable or disable users from accessing certain components or functionality of the system 1000. Integration component 1040 may establish user accounts for contributors and may enforce authentication and authorization rules to control access to integration component 1040 and/or other components of the system.

Integration component 1040 may also facilitate communication between other various components of the system 1000. For example, integration component 1040 may direct one or more of the other components to take some action, communicate with another component, relay information between components, or the like.

Integration component 1040 may provide one or more content tools 1045. Content tools 1045 may provide to content contributors a set of one or more content viewing and editing tools. For example, content tools 1045 may include word processing applications, graphic design applications, or other applications. In some examples, these applications may include WYSIWYG (What You See Is What You Get) editors, which are editing interfaces in which the content displayed on the screen during editing appears in a form closely corresponding to its appearance on the target device. In some examples, the content tools 1045 may also provide a simulated view of the content provided by the simulator (discussed below). This preview simulates how the content will look and function on a target device or medium. Content tools 1045 may be integrated with other components such that users may open defects, kick off builds, create new content, and the like from within the tools. In some examples, content tools 1045 may include web-based applications which are accessed over a network (such as network 1030). In FIG. 1, content tools 1045 are shown as part of integration component 1040, but in other examples, the content tools 1045 may be applications which are locally executable on terminals of the various contributors. These locally executable applications may communicate with the various components to perform these functions over network 1030 through integration component 1040 (or directly with the various components). For example, editing tools such as TEXTMATE® developed by MacroMates Ltd., CODA® developed by Panic, Inc., of Portland, Oreg., or the like may contain one or more add-ins which link the standalone tools to the integration component 1040 and other components.

In one example, integration component 1040 may be located on one or more computer systems accessible by content creators 1010 and content editors 1020 through network 1030. In yet other examples, integration component 1040 may be locally executable on computer terminals of contributors such as content creators 1010 and editors 1020 and may utilize network 1030 to access the other components of the system 1000. In yet other examples, integration component 1040 may include components executable on both the computer terminals of content creators 1010 and editors 1020 as well as pieces accessible and executing on a remote server accessible over network 1030. Integration component 1040 may be or include various computer-executable binary files, HTML, XML, JavaScript, PHP Hypertext Processor (PHP), Asynchronous JavaScript and XML (AJAX), Common Gateway Interface (CGI), or other components.

While the various tasks herein described may be performed through an interface provided by the integration component 1040, in other examples, the individual components may provide their own interfaces which may be used along with, or supplementary to, the interface provided by the integration component 1040.

In some examples, integration component 1040 may interface with asset management component 1050 in order to facilitate the creation of the electronic content work as a whole from a number of content portions (e.g., creating a textbook from the component text and illustrations). Content portions may be any audio, visual, audiovisual, text, or other content which is intended to be merged with other content portions into an electronic content work. Content portions may also be referred to as "assets." Asset management component 1050 may be a network-addressable component which, in conjunction with integration component 1040, may allow for the management of the content creation process by managing the submission, modification, and integration of various component portions of the electronic content. This creation management process may include indexing and tracking submitted components, identifying missing content, assigning sections of missing content to one or more contributors, and managing the integration of submitted content into a complete or nearly complete version of the electronic content work. In some examples, the asset management component 1050 may implement version tracking to track changes made to the component content portions.

Figure 1B:
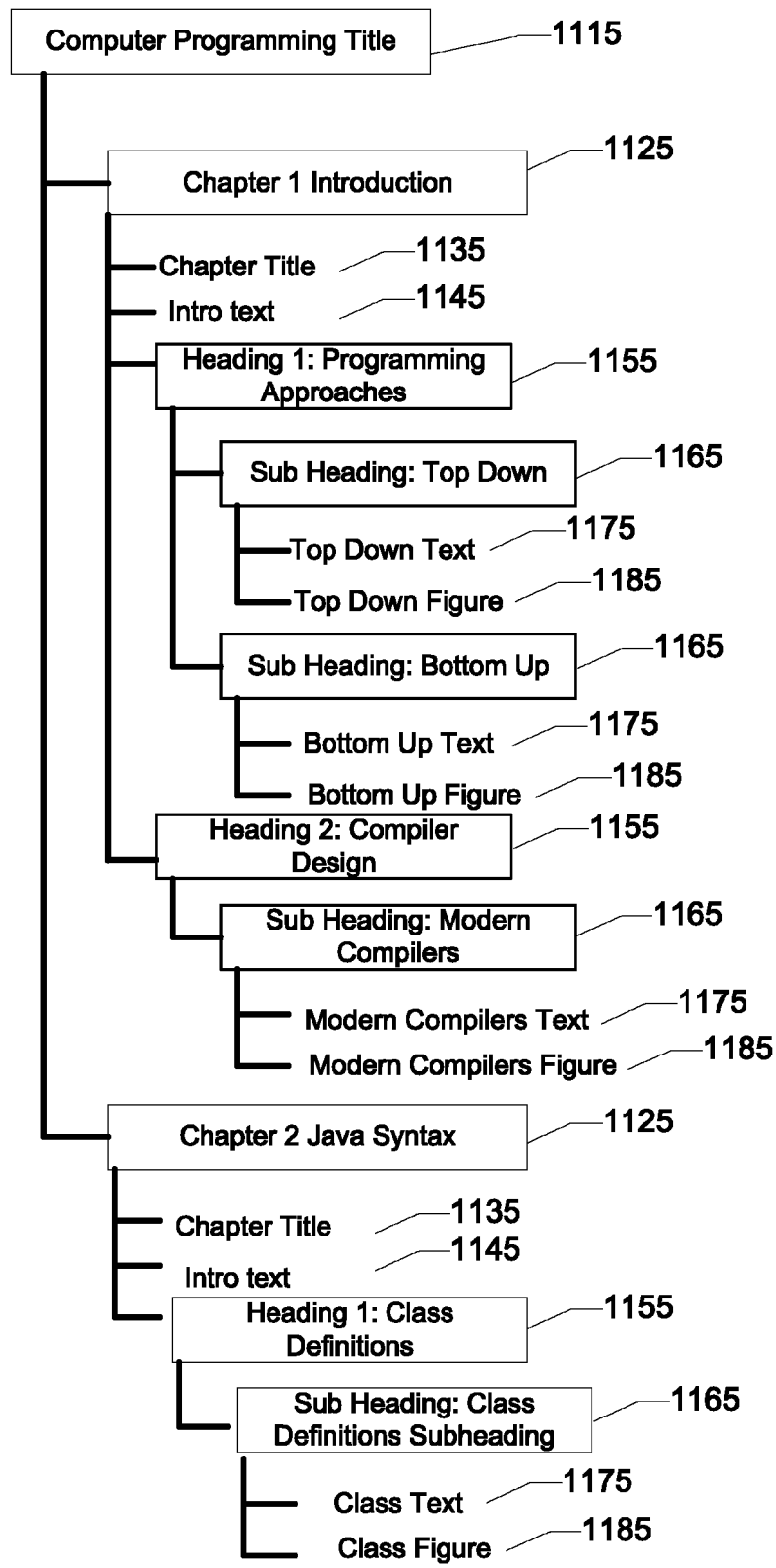
FIG. 1B shows a schematic of an electronic content template, according to some examples of the present disclosure.

In some examples, asset management component 1050 may utilize content templates, which may specify various component portions of the work that are required to complete the work. These content templates may be submitted by contributors such as content creators 1010, content editors 1020, or any other contributor. FIG. 1B shows an example content template. The content template may describe the structure of the electronic content work (or a portion of it) and the location of one or more content portions. The content template in FIG. 1B shows a template for an electronic textbook on computer programming. The template shows the layout of various elements and content portions. For example, the template shows the ordering within the electronic work of the title 1115, chapters 1125, chapter titles 1135, chapter intro texts 1145, various headings 1155, various sub headings 1165, subheading text 1175, and subheading figures 1185. While not shown in FIG. 1B, each portion of the electronic content may specify element styles (e.g., font, layout, color, etc.) for that particular element. These content portions will be tracked by the asset management component 1050. Incomplete or otherwise deficient content portions may be assigned to one or more contributors for correction or completion and submission. In some examples, the content template may allow for one or more optional features or sections. For example, the content template may allow a contributor to specify that a particular section, chapter, subheading, or the like, is optional. Missing optional features may or may not be assigned to contributors.

The asset management component 1050, in conjunction with integration component 1040, may be used to track which component portions of the electronic work have already been submitted and which have not, as well as whether submitted component portions are complete. The asset management component 1050 may also be used to track and manage requests for one or more missing or deficient component portions from one or more contributors. In some examples, the asset management component 1050 may allow for workflow management, which allows for tracking individual content portions as individual entities. This may prevent an issue or late submission relating to a content portion from delaying work on other content portions by other contributors.

Unfinished or unsubmitted content portions may be requested from, or assigned to, one or more contributors (e.g., content creators 1010 or content editors 1020) by other contributors (e.g., content creators 1010 or content editors 1020) through integration component 1040. In other examples, such assignments may be done automatically. Contributions (e.g., unfinished or unsubmitted content portions) may be automatically assigned in a round-robin fashion, assigned to the person who has the fewest contributions outstanding, assigned to a contributor who has been assigned to be responsible for that particular contribution or portion of the electronic content, assigned to a supervisor who may delegate to a subordinate responsibility for contributing the content and the like. In some examples, a contribution may include or have associated therewith an estimated work effort for the contribution. This estimated work effort may take into account the size of the change required and/or the complexity of the contribution, and the like. The estimated work effort may be expressed in terms of an amount of time estimated to complete the contribution, an amount of content estimated to complete the contribution, or another metric by which an amount of work effort needed to complete the contribution may be measured. In some examples, integration component 1040 or asset management component 1050 (or some other component) may calculate the workload of each user (e.g., the workload of a content creator 1010, content editor 1020, or other contributor) based upon the sum total of the estimated work effort for all unsubmitted contributions assigned to that user and use the workload to assign contributions to users with a lower workload relative to other users. Assignment may also represent the desired workflow within an organization, such as first assigning to a supervisor who then delegates to a subordinate for completion.

In other examples, such automatic assignments may be based upon one or more assignment rules. Assignment rules may consist of a set of one or more criteria that are used to determine to which contributor the missing content portion is assigned. These assignment rules may be created by content contributors through integration component 1040. In some examples the criteria may be or include content type (e.g., text, image, video, audio, etc.), chapter, section, style, size of the missing or deficient content portion, and the like. The missing or deficient content portion may then be compared with the assignment rules to find an assignment rule which matches the missing content portion. One example assignment rule may be that all illustrations may be assigned to a particular contributor (or group of contributors). Other assignment rules may combine one or more criteria. For example, all text in chapter 10 may be assigned to a particular content contributor (or group of contributors). In other examples, default rules may be created if the content does not match another rule. For example, this rule may specify that all content not matching previous rules may be assigned to a particular contributor (or group of contributors). As an example, if a drawing is missing in chapter 20, the system 1000 may search the various criteria stored to determine which user or user(s) (e.g., content creators 1010, content editors 1020, or other contributors) to assign the contribution to. If no users are found, then the default rules may specify which user or user(s) to assign the contribution to. In some examples, these assignment rules may be expressed as one or more statements of Boolean logic. For example: "if (content_type==illustration) then assign to user '1234.'"

Once a match is found, the system 1000 may utilize various algorithms (such as round-robin or first match found) to select one of the matching users (if there is more than one matching user). The selected user is then sent a request for the missing or deficient content portion. These requests may be sent to the contributors (e.g., content creators 1010, content editors 1020, or other contributors), and may appear as a notification when contributors (e.g., content creators 1010, content editors 1020, or other contributors) connect to integration component 1040 by "logging in" or accessing integration component 1040, or the request may be emailed to an email address on file for the contributor, sent as a text message to the user, or the like.

Upon completion of their one or more assigned contributions to the content, contributors may submit them through integration component 1040, which may then submit the content to the asset management component 1050. In some examples, if the content is a new version of a previous submission, the asset management component 1050 may create a new version of the asset and save the submitted content as a new version, while preserving the old content as an old version. In other examples, the asset management component 1050 may create a new version of the entire electronic content work so that the progress of the entire electronic content work may be tracked based on submissions. In other examples, the new content may be merged with the old content or may overwrite the old content. Merging may be useful where more than one contributor is modifying or submitting contributions to the same particular section of content. In some examples, the process of merging includes presenting a comparative view of the base version of the content, a version of the changes made by one or more other contributors, and the changes made by the current merging contributor. The merging process may allow the merging contributor or some other contributor to choose the various changes which are to be incorporated into the final content and those which are not to be incorporated. In some examples, merging may not be appropriate for all content types, such as binary files, videos, or the like. If merging is not appropriate, the user may have the opportunity to select which version (e.g. the existing version or the user's version) of the content to keep.

As described, contributors may create the content using their own creation tools (such as local word processing or graphic design programs) and import the content into the system 1000 via integration component 1040, but in other examples, contributors may use content tools 1045 to create the content. For example, a user may add an asset to the content at any time by utilizing content tools 1045 provided by integration component 1040 or some other component of the system 1000.

Asset management component 1050, in conjunction with integration component 1040, may also allow contributors (e.g., content creators 1010, content editors 1020, or other contributors) to integrate the various component pieces of the content into a draft of the electronic content. In some examples, integration component 1040 or asset management component 1050 may automatically create the draft based upon the content template. In these examples, the submitted assets may be arranged as described in the template. In other examples, integration component 1040 may present a user interface, which may allow the contributor to arrange the various component content pieces according to their desired position. In some examples, creating the draft work may include concatenating and assembling the various content portions into one file (e.g., taking the disparate text, graphics, and the like and making one .pdf file)—assembled and arranged as specified. In yet other examples, creating the draft work may include associating the various content portions with each other in the structure and arrangement which is specified in the template and/or the content portions themselves (e.g., a text content portion may specify a location of a graphic or drawing). In some examples this may be done through the use of markup tags (e.g., in the content portions themselves and/or in a template or outline markup) which may specify the location of one or more content portions.

Once the contributors are satisfied with the draft of the electronic work, the work may be submitted to the content management component 1060. In some examples, defect tracking through the defect tracking component 1070 may also begin. This may be done through the use of integration component 1040. Integration component 1040 may then coordinate the delivery of the content from the asset management component 1050 to the content management component 1060 (if necessary), coordinate starting of the version control of the work as a whole (in some examples, versions may be managed on the content portions and the work as a whole simultaneously), and coordinate stalling the defect tracking process. Editors 1020 or other contributors may then begin editing the electronic content.

Defect tracking component 1070 may be a network-addressable component which, in conjunction with integration component 1040, may include tools which allow users to open defects, track defects, fix defects, and close defects found in electronic content. These defects may be opened up by content proofers 1020 or other users (e.g., content creators 1010 or other contributors) by selecting or otherwise indicating a particular section of content for correction and specifying information on the defect. For example, a contributor may be reviewing the content through content tools 1045 (which may be integrated with the defect tracking component 1070). Content tools 1045 may allow users to open defects by selecting or otherwise indicating the defect in the content itself and entering information about what is defective. Content tools 1045 may then pass this information to the defect tracking component, which may open a defect. In other examples, defects may be opened by the quality assessment component 1080 as a result of automatic content checks performed by the quality assessment component 1080. The QA component may send a message to the defect tracking component 1070 with information on the defect, and the defect tracking component 1070 may open the defect.

The content tools 1045 may be further integrated with defect tracking component 1070 by providing an interface which allows an editor or other contributor to view and edit the content with information on the various defects displayed above the content to which it is associated. The content tools 1045 may show conversations about the defect, defect states, defect histories, or the like displayed above the content portion to which the defect is associated.

When a contributor uses the content tools 1045 to open a content portion, content tools 1045 may query the defect tracking component 1070 for information on any defects associated with that version of the content. Any returned defects may then be displayed along with the content. Viewing other versions may display the defects associated with those versions (a defect may be associated with a version when the defect is opened and may automatically be associated with subsequent versions of the content until the defect is marked as fixed or closed).

In other examples, the content itself may contain metadata identifying the defects in the portion of content. For example, if the content is represented by a markup file, (e.g., XML), the defect may be noted by the insertion of custom markup elements which may identify defects and their locations. The metadata may contain some or all of the defect record and may contain enough information to allow content tools 1045 to display information on the defect along with the content without having to query the defect tracking component. Once a defect is fixed, a new version of the content portion would be created which would not have the defect noted in the custom markup file and thus the defect would not be displayed. In some examples, the markup would contain enough information for content tools 1045 to display the defect, but in other examples, the markup may just be an indication of the defect (and in some examples a defect identification number) and integration component 1040 may need to request additional information from defect tracking component 1070 in order to display the defect information.

In some examples, the defect may be shown with the content by highlighting text, drawing arrows over the content, attaching in-line notes, or displaying defects related to the content in a separate window or frame of the content or the like. In some examples, the defects may be notes attached to particular content portions, but in yet other examples, the notes may be floating in the content portion (e.g., at a particular on screen coordinate). In some examples, various arrows may be drawn from the notes to other content portions.

When defects are created, they may be related to a specific version of the electronic content (the versions are tracked by the content management module.) When the state of a defect changes, e.g. from "Open" to "Resolved", the defect tracking module may record the version of the content at that time and relate it to the defect. This relation allows proofers to first see the original defect in the context of the older revision of the content and then confirm that the defect has been fixed in a later version of the content. When a defect changes state at the same time as the content, e.g. from "Open" to "Resolved", the content management component 1060 may also record metadata about the defect, e.g. defect number and new state, along with the edits to the content that caused the defect to change state. Storing defect state changes along with the details of changes made to the content serve a number of purposes. When reviewing code changes in the content management component 1060 for a specific project, a content change can be put into context by linking from the content change to the defect tracking component 1070, using the defect metadata, such as the identifier. In another example, when a build of the content is created, a manifest of content changes and defects that have been resolved or referenced since the last build can be created.

While in some examples the defects may be corrected by the user that finds them, in other examples, defects may be submitted to other users who may fix the defects. These defects may be assigned to a user in a variety of ways. In one example, other contributors may assign defects to various users. In other examples, defects may be assigned automatically by the system 1000. Defects may be automatically assigned in a variety of ways. Defects may be automatically assigned in a round-robin fashion, assigned to the person who has the fewest defects assigned, assigned to a contributor who has been assigned to be responsible for that particular contribution or that particular portion of the electronic content work, assigned to a supervisor who may delegate to a subordinate responsibility for contributing the content, and the like. In some examples, a defect may have associated therewith an estimated work effort for the fix. This estimated work effort may take into account the size of the change required and/or the complexity of the fix. The defect tracking component 1070 may calculate each user's workload based upon the sum total of the estimated work effort for all open defects assigned to that user and use the workload to assign defects to users with a lower workload relative to other users.

In other examples, automatic assignments may be based upon one or more assignment rules. Assignment rules may consist of a set of one or more criteria that are used to determine which contributor the defect is to be assigned to. These assignment rules may be created by content contributors through the integration component 1040 interface. In some examples, the criteria may be or include content type (e.g., text, image, video, audio, etc.), chapter, section, formatting style, size of the defect, size of the estimated work effort to fix the defect, subject matter of the content where the defect is located, defect type (e.g., formatting defect, spelling defect, layout defect, etc.), and the like. Information on the defect may then be compared with the assignment rules to find an assignment rule which produces an assignment to one or more users. One example assignment rule may be that all illustration defects may be assigned to a particular contributor (or group of contributors). Other assignment rules may combine one or more criteria. For example, all layout defects in chapter 10 may be assigned to a particular content contributor (or group of contributors). In other examples, default rules may be created if the defect is not assigned by another rule. As an example, if a drawing is defective in chapter 20, the system may search the various criteria stored to determine to which user or user(s) to assign the defect. If no users are found, then the default rules may specify to which user or users to assign the defect. In some examples, these assignment rules may be expressed as one or more statements of Boolean logic. For example: "if (content_type=illustration) then assign to user '1234'".

Once a match is found, the system 1000 may utilize various algorithms (such as round-robin or first match found) to select one of the matching users (if there is more than one matching user). The selected user is then sent a request to fix the defect. These requests may be sent to the contributors (e.g., content creators 1010, content editors 1020, or other contributors), and may appear as a notification when contributors (e.g., content creators 1010, content editors 1020, or other contributors) connect to integration component 1040 by "logging in" or accessing integration component 1040, or the request may be emailed to an email address on file for the contributor, sent as a text message to the user, or the like.

Defect tracking component 1070 may also track defect state, with some example states including "open" to indicate the defect has been opened, "assigned" to mean the defect has been assigned to an editor for fixing, "fixed" to indicate the defect has been fixed, "merged" to indicate the defect has been merged into the electronic content, and "closed" to indicate that the defect has been verified as fixed. Other example states will be apparent to one skilled in the art with the benefit of the present disclosure.

Editors or other contributors may fix the defects by editing the section of content using the content tools 1045. In some examples, the integration with the content management component 1060 may be seamless to the editor or other contributor. That is, the content tools 1045 may automatically handle access and version control. In other examples, if the editor or other contributor is using off-line tools, the editor or other contributor may be required to manually handle access and version control through integration component 1040.

Defect tracking component 1070 may also allow a defect or other error to be ignored. For example, defects which are known and are not fixable until later may be ignored. Defects may be ignored permanently, or for a certain amount of time, or for a certain number of versions, or defects may be ignored until a particular version is reached of the content.

Content management component 1060 may be a network-addressable component and may integrate with integration component 1040 or other components of system 1000 to control the content making up the electronic work. This may include access control and version control. In some examples, access control may specify which users may access the various portions of the content and also how to handle conflicts that may arise due to multiple users accessing the same portion of content. In some examples, version control may record and track all the changes that any contributor may make to the electronic content, and provide access to all prior revisions to each content portion and allow users to step through the history of each content portion by walking over the revisions. Content management component 1060 may also integrate with quality assessment component 1080 and defect tracking component 1070. For example, upon submission of a change to the content, the quality assessment component 1080 may automatically run automated reports about the quality of the content (these reports will be described later). The number of errors and warnings may be compared to the number of errors and warnings generated by the last report and a defect may be opened for any new errors or warnings in the newly-added content. The defects added may be automatically assigned to the contributor who introduced them. In other examples, the quality assessment component 1080 may verify that defects which are marked as fixed are actually fixed if they relate to a defect opened by, or as a result of, reports run by the quality assessment component. These actions may be facilitated by the content management component 1060 which may notify these components upon submission of new content.

In some examples, user access control may be implemented through various permission-based rules. In one example, users (e.g., contributors), may belong to one or more groups of users and content may be organized into one or more groups. User groups may be given access to one or more content groups. Each user group may have one or more users, and each content group may have one or more content portions. In other examples, each user is individually given access to various portions of content or groups of portions of content. A user or group of users may be granted read, write, delete, or other access types to a portion of the content or a content group.

In some examples, user access control may handle contentions between contributors for editing the portions of content. For example, if two contributors attempt to make changes to the same portions of content, the content management component 1060 may handle this in different ways. In one example, when a contributor attempts to make a change to a portion of the content, the system first checks to see if another user is editing that portion of the content. If another user is editing that portion of the content already, the user is denied access to that portion. If no other user is currently editing that portion of content, the user is granted access and other users are prevented from editing that portion of the content.

In other examples, multiple users may make changes to that portion of the content at the same time. This may be done by creating a contributor-specific copy of the portion of content either on the contributor's local terminal or on the content management component 1060. The contributor may freely edit this contributor-specific file as changes made to this file will not affect the master copy of the content. When the contributor is finished making changes, the contributor-specific copy may then be incorporated into the master copy of the file stored on the content management component 1060. In some examples, this incorporation is done through the use of a merge process whereby the changes made to all the individual contributor-specific copies by all the contributors who were modifying that content are integrated into the master copy. In other examples, the contributor-specific copy may replace the master file (becoming the new master file), or may supplement the master file as a new version.

The content management component 1060 may implement version control which may track various versions of the content or portions of the content. In some examples, version control and user access controls may allow the content management component 1060 to implement advanced content management functionality. In some examples, the content may be organized into one or more versions of the electronic content, each version having a separate copy in the content management component 1060. Contributors may then create contributor-specific copies of specific versions of the entire electronic content or portions of the entire content in order to make changes to the content. When the contributions of a contributor are complete, the contributor may merge the contributor-specific version back into the version of the electronic content from which it was copied or into a new version. If no other changes were made to that section of content in this version, the contributor-specific changes to that section of content may simply replace the section of content for that version stored in the content management component 1060. However, if multiple contributors were working on the same portions, a merge may be necessary to avoid overwriting other contributors' changes. This merge may function as previously described, allowing for the selection of the correct sections of content. Once all the contributors have finished with their revisions, a new version may be created by copying the current version, and the process may be started again.

In some examples, the content management component 1060 may allow for change rollback, in which some or all of the changes submitted in previous versions may be removed in later versions. For example, if changes are introduced in version five, those changes may be removed several versions later, for example, in version eight. In some examples, this may be useful to remove changes that later prove to be erroneous or undesirable. The content management component 1060 may calculate the change introduced in a specific version and then remove those changes from a new version, the current version, or a previous version. In some examples, these changes might be all changes made to a specific version, or specific changes, such as for example, changes introducing a defect, all changes made by a particular contributor, all changes made to a certain content portion, or the like. In some examples, dependencies may necessitate a merge-like interface where a contributor must assist the system in removing the changes. This merge-like backout interface might be necessary where the content portions which need a change removed have been modified since the introduction of whatever change is to be removed or where the content portions which need a change removed were modified by multiple contributors (e.g., two contributors introduce two separate changes into the same version of the content portion and only one is to be backed out). This merge-like backout interface may present a contributor with a specific change to remove and the current content portion, and allow the contributor to select which changes or content to keep, which to remove, and the like.

In other examples, the content management component 1060 may allow contributors to make contributor-specific copies of a whole version of the electronic content. These "forks" may then have versioning applied to them such that two independent lines of content are now in existence—the original version or "main branch" from which the contributor-specific copy was made, and the copied, or "forked" branch. These branches may then be independently worked on by one or more contributors which may result in two branches with different content. The fork may then be merged back into the main development trunk later on. A fork may be used when, for example, different product versions are desired (such as a standard version and a premium version) or to support multiple teams which may be working on multiple features of the electronic content.

If the user is utilizing the content tools 1045 or another application integrated with the various components of the system, the process of access control and version control may be handled automatically and seamlessly to the user. For example, upon editing a portion of content, the content tools 1045 may reserve the file to prevent others from editing, or may make a local copy of the file and handle any content merges. Content tools 1045 may also create a new version of the content.

Content management may also allow for content tools 1045 or other components to access older versions or revisions of the content as well as providing metadata related to those versions (such as the changes made to that version, who made them, when they were made, and the results of any quality assessment reports). In some examples, content tools 1045 may utilize this to allow a user to browse previous versions in order to see the content as it evolves.

In some examples, integration component 1040 also includes a device simulator which may provide a preview mode accessible to contributors. Since the electronic content may be targeted to multiple and disparate electronic device platforms, and since the content may not be rendered identically across disparate electronic device platforms, integration component 1040 may include a device simulator which allows the contributor to build the content locally (or allows integration component 1040 to interface with the publishing pipeline 1090 to build the content) for the particular desired target electronic device and through an emulator running in the system preview how the content will look and react to input and other stimuli. The emulator emulates the environment of the target electronic device so the contributor will have an accurate representation of how the electronic content performs on the target electronic device. In other examples, integration component 1040 may allow a contributor to build the electronic content and electronically transfer the built content to an external electronic device for testing on a real device. In some examples, the preview mode may allow a user to quickly jump between different preview versions of the rendered content. This may be useful in verifying that defects have been fixed by first viewing the version with the defect, and the version with the fix applied to ensure the defect is not present.

While in some examples the preview functionality may be a standalone portion of integration component 1040, in other examples it may be integrated into content tools 1045. In these examples, the preview mode may be accessible by a menu, toolbar, popup window, pop-under window, frame, button, link, or the like. In some examples, these menus, toolbars, and the like may be located in the same or different screen or frame as the content displayed by the content tools 1045. Thus, in one example, the user may be editing or viewing a content portion and then may click a button at the top of the screen to build and/or simulate the content. Users may edit and view content and then easily activate the functions of the simulator to build the content and view and interact with an accurate representation of how the electronic content looks and interacts on the target electronic device. For example, the integration component 1040 may utilize the simulator to provide a preview mode of the content to contributors.

Quality assessment component 1080 may be a network-addressable component that works with other components of system 1000 and may generate content reports or notifications which may check for various content irregularities and defects automatically, at regular intervals, or on demand. Example irregularities and defects may include inconsistencies in the content, broken or missing links, content which does not properly render, fails to meet standard conventions (e.g., based on an ACID 3 test from the Web Standards Project or some other compliance test), or the like. Other example reports may include:

image reports which verify that images meet the minimum resolution, correct alpha channel, minimum color depth, and the like;

TOC duplicates reports which check the table of contents for duplicate entries;

DOCType reports which check that certain content contains an XML element "DOCType";

identification reports which ensure all elements have associated identification numbers and that there are no duplicate identification numbers across the electronic content work;

file name reports which check to ensure that all the file names of individual content portions conform to a predetermined specification;

glossary duplicates reports which check for duplicate glossary entries;

CSS reports which check for any badly formed CSS (Cascading Style Sheets);

missing files reports which check for files that are referenced but do not exist;

links reports which find any broken links;

page order reports which make sure that the page order attributes are monotonically increasing;

header reports which ensure headers are correctly formatted in title case;

definitions reports which ensure that any references enclosed in "<dfn>" tags match corresponding glossary entries;

unused files reports which find all files that are unreferenced in the project; and card titles reports which verify titles are formatted consistently.

In another example, a content schema report may be generated. For example, the content may normally have a specific format, and deviations from that format may be reported as an error. Some example inconsistencies may include capitalization irregularities, format irregularities, font irregularities (e.g., font type, style, color, format, and the like), unrecognized characters, organization, misspellings, and the like. In some examples, this may be accomplished by comparing an expected format to an actual format and opening defects based upon those differences.

In some examples, the expected format may be a template provided by a contributor (which may be the same template used with the asset management component 1050 in preparing the content, or a different template). In other examples, the template used in the comparison can be generated automatically based upon the content itself. The system may scan the content or previous versions of the content, and discern the expected format and use this as a template against which to flag irregularities. The system may use various information and metadata to ascertain the expected format of the electronic content. In some examples, the content may be in a markup language format. In these examples, the markup tags may be used to discern the expected format. Thus, for example, the system can learn that the document should have a title for each chapter, one or more headings for each chapter, and at least one subheading for each heading. For example, if the content normally has a chapter heading and a subheading in each chapter, and a particular chapter or portion of the content has a chapter heading without a subheading, the system may flag this as a defect.

The template may be compared to the actual format of the content. The actual format of the content itself may be ascertained from information in the content such as markup language, metadata, formatting information (e.g., styles, font sizes, etc), media type (e.g., text, audio, visual, etc) and the like. If the actual format of the content is not the same as that of the template, then an indication may be noted on a report run by the quality assessment component 1080, or a defect may be opened in conjunction with the defect tracking component 1070.

In some examples, any report generated by the quality assessment component 1080 may be run on the content in regular intervals, or in response to a particular event. Intervals may be time based, and may be done every second, minute, hour, day, week, month, year, or the like. The reports may also be run in response to a particular event, for example, upon submission of new content, changes to the content, merges of content, deletion of content, or the like.

While these quality checks may be delivered in the form of a report, in some examples, they may also be delivered to users as a notification of a different type. For example, the reports (or findings of the reports) may appear as a notification when contributors connect to integration component 1040 by "logging in" or accessing integration component 1040, or may be emailed to an email address on file for a contributor, sent as a text message to the user, a voice mail, an instant message, a text message, or the like. In some examples, content contributors may be notified of errors as they are editing the content (e.g., to correct a defect, or to work on a content submission). These notifications may be in the form of a pop-up or other on-screen notification. In some examples, findings of the reports may be assigned to individuals to investigate or fix the same way defects are assigned (even though they may not be entered as defects immediately).

In some examples, the quality assessment component 1080 may integrate with the defect tracking component 1070 and the content management component 1060 to ensure that changes introduced into the content do not add additional errors to the content. If errors are found, the changes made to the content may be removed and the contributor who added the change notified. In other examples, the defect tracking component 1070 may automatically create a defect record of that issue. Quality assessment component 1080 may interface with defect tracking component 1070 to verify that a defect which has been reported as fixed, has indeed been fixed. For example, if a defect was opened for a broken link in one content version, and then reported fixed in another content version, the qualify assessment component 1080 may verify that the link was fixed and automatically set the defect state to "resolved," "closed," or the like. In some examples, various errors and warnings found by the quality assessment component may be ignored. Errors and warnings may be ignored permanently, for a particular period of time, a particular number of content versions, or until a particular content version, or the like.

Integration component 1040 may provide a graphical user interface detailing the various findings of the quality assessment component 1080. For example, the various reports may be displayed along with the errors and warnings generated. Users may drill down into each report to see the different errors and warnings and in some examples, upon selecting a specific error or warning, may be taken to the content where the error will be displayed.

Project management component 1085 may be a network-addressable component and may integrate with integration component 1040 or other components of system 1000 to control and store data related to project management of one or more electronic works. In some examples, project management component 1085 may allow project managers to manage the lifecycle of multiple electronic content works. The lifecycle of a particular electronic content work may be divided into a plurality of phases. Example phases include explore phases (high level project scoping), planning phases (e.g., development of high level project specifications), sample & style phases (e.g., a first draft done to some of the content to evaluate the style), build phases (application of the specifications to the rest of the content), solidify stages (clear any automated reports from the quality assessment component), and proofing stages. One skilled in the art with the benefit of Applicants' disclosure will appreciate that different phases may be used.

Each phase may have a desired begin date (or a dependency to a previous task which may fix the begin date as the completion date of the previous task) and an end date (or an estimated work effort which may determine the end date). Each phase may comprise one or more deliverables (e.g., "deliver chapter 6") which may need completion prior to proceeding to the next phase. The deliverables may have one or more states associated with them. For example, each deliverable may have "open," "completed", and "closed," states indicating whether the deliverable is still open, whether it is completed, and whether it is closed (i.e., verified completed). Deliverables and phases may be entered into the project management component through the integration component interface and stored in the project management component. In some examples, deliverables or phases may be linked to the number of defects still open in the electronic content such that a deliverable or phase may not be completed until the number of defects open falls below a specific threshold. In other examples, project managers may also link certain tasks, or "to-dos" to deliverables or phases such that those certain tasks must be completed prior to completion of a deliverable and/or phase. To-Do's are individual instructions or tasks (e.g., "update links in document").

Project management component 1085 or integration component 1040 may provide one or more graphical user interfaces which may allow project managers or other contributors to create and manage the various phases, deliverables, to-dos and the like as well as viewing the current status of each project. In some examples, the project management component 1085 or integration component 1040 may also provide a dashboard interface which may show a project manager a summary of the current status of multiple electronic content works. This may allow a contributor such as a project manager to determine at a glance the status of various electronic content works. The dashboard will be described in more detail with respect to FIG. 6 below.

Once the content is ready for publication, one or more of the contributors may publish the electronic content work. Publication (or "building" the content) is a process by which a format independent representation of the content is transformed into a format dependent representation of the content. For example, the content may be customized for a particular client device (e.g., iPad) or for printing on a particular format (e.g., letter paper size, legal paper size, A4, or the like).

This process may be done through the integration component 1040, which may prompt the individual to input a number of various options including which target platforms or formats to build the electronic content for, whether the entire work is to be built or only selected portions, and the like. Content may be built by the publishing pipeline 1090, which may convert the various electronic content pieces to a format compatible with the particular target device or medium. This conversion process may include changing the layout of the text based upon the available screen resolution or paper size, selecting or reformatting images, video or audio to work with the device or printing type (e.g., paper size, black and white vs. color, and the like), selecting one or more alternate content pieces based upon the capabilities of the device (e.g., inclusion of a particular video selected from a number of videos where the video is tailored to the performance capabilities of the machine or the video codecs or the like that are supported), and the like. In other examples, content that may not be displayed on a particular type of medium or device may be removed and replaced with alternative text, links to online resources to view such content, or the like. For example, if the publication converts the content into a format ready for hardcopy publication, videos may be replaced with boxes which display information about the content of the video and links which direct users to online versions of the video. The publishing pipeline 1090 may have one or more profiles of various target devices and media. These profiles specify the capabilities of the media and/or device. The publishing pipeline 1090 then publishes the electronic content by comparing the various content portions against the capabilities of the media or device. If the electronic content requires device or media capabilities that are not present on the media or device, the content is removed, resized, replaced with compliant content, or the like. In some examples, the layout and pagination of the content may be changed. Text may also be adjusted so as to conform to the layout and pagination of the target media or device.

In some examples, content may be built on-demand at the request of a contributor. In other examples, the publishing pipeline 1090 may monitor the content on the content management component 1060 and build the content automatically upon occurrence of an event related to the content. In some examples, these events can include content changes, new versions of the electronic content or a portion of the electronic content, changes to the state of one or more defects (e.g. certain defects being fixed), defect thresholds (e.g., the content is built after the total number of identified defects goes below a certain threshold), or the like.

Once the electronic content has been built by the publishing pipeline 1090, the publishing pipeline may distribute the published content. In some examples, the publishing pipeline 1090 may accomplish this by interfacing with the electronic store 1100 which may then make the content available for download by the end-user 1110 on an electronic device over a network 1105. In some examples, the publishing pipeline 1090 automatically causes the electronic device of end-user 1110 to download the electronic content or updates to the electronic content. In some examples, these "push" updates may not be done through the electronic store 1100, but in other examples, the electronic store 1100 may facilitate the "push" update. In some examples, where the electronic content is just being updated with new or corrected content, only portions or modules of the electronic content may be built and pushed to the electronic devices.

In other examples, where integration component 1040 includes a simulator for simulating the electronic content on a particular electronic device, the publishing pipeline 1090 may perform a test-build of the content. The built content is then delivered to integration component 1040, which displays the built content in the simulator.

In some examples the various components of system 1000 may be physically located on one or more machines, and the functions of the components may be implemented by one or more applications miming on the one or more machines. Additionally, the functionality described for one or more of the components may be performed by different components than those that have been described. In examples where the functions of system 1000 are spread out across separate machines, these machines may communicate with each other through the use of direct connections, and/or a computer network such as network 1030 or 1105. In some examples, some components may be on a distributed or parallel computing platform with physical hardware located in multiple locations that communicate through a computer network and have a single interface to an external user or client such that users or clients interact with the system as if it were one logical system. In some examples, these components can be or include distributed databases. In some examples, the data stored on these distributed databases may be sharded. Database sharding is a method of horizontal partitioning in a database or search engine. The basic principle is that rows of a database table are distributed across the distributed database. While some examples of system 1000 relied upon integration component 1040 coordinating among the various components or providing the interface to the other components of the system, it will be apparent to one skilled in the art with the benefit of the present disclosure that one or more of the constituent components of system 1000 may coordinate various functions on their own or have their own user interfaces separately accessible by content contributors.

Figure 2:
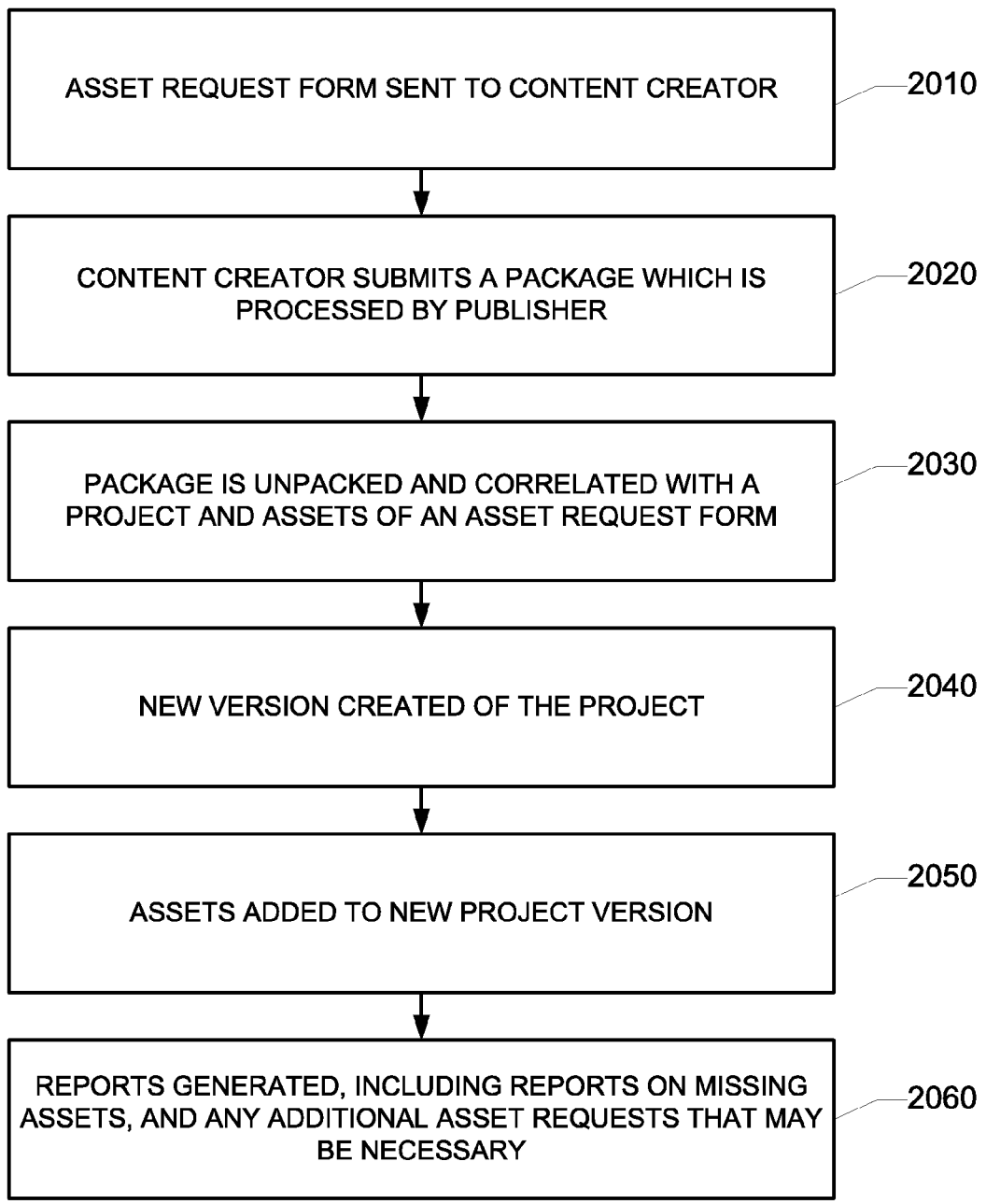
FIG. 2 shows a flowchart of a method of electronic content creation, according to some examples of the present disclosure.

FIG. 2 shows one example method for creating content. In operation 2010, an asset request form may be sent to one of the content creators or other contributors. The particular assets and the particular content creators that are selected to create those assets may be selected by a project manager or other user, or may be selected automatically as previously described. Once the content creator finishes creating the content, the content creator may submit a content package to the system at operation 2020. The content creator may submit the content package to the system through any method of file transfer which may allow the contribution to be sent to the system. In some examples, this may be done through a file upload dialog interface provided by integration component 1040, an FTP (file transfer protocol) server, by emailing the content to a special email account associated with the integration component 1040 or emailing the content to an administrator or other user who may upload it to the system.

Content creators or other contributors may submit multiple content portions for multiple projects in a common package. In some examples this may be in a .zip file or some other compressed and/or archived file. The contents of these files may then be extracted by the integration component 1040 or other component of the system 1000, and the contents may then be matched to a particular project using tracking information in operation 2030. The tracking information may be a content identification number assigned to each requested asset by the system 1000 and sent to the contributor along with the asset request form. Upon submission of the content, the contributor may tag the assets with the content identification number. In other examples, the packaged assets may include a description file to match content identification numbers to assets in the package using metadata or file information. For example, the description file may specify that a file with a particular name, size, or type matches a particular content ID. In still yet other examples, if no tracking information was included, the system may attempt to match the particular assets in the package with assets requested and still outstanding from the content creator. Such matching may utilize the contents or the metadata of the file (including size, filenames, and the like) to attempt to match the individual content to requests based on the file information that the system expects to receive. In other examples, the asset request form may specify a filename or other file parameter that it expects the particular asset to have. If an asset is not matched to a particular asset request, it may be sent back with an error notification to the content creator. In other examples the content may be sent to a user for manual review and matching.

In some examples, once the content is associated with the right asset request on the right project, a version of either the project or the asset may be created at operation 2040, and the assets may be added to the project at operation 2050. As already explained, a new version may be created for the portion of content added or for the entire project, and if this is a new version of a portion of content that is already existing (e.g., to update or correct defects or change content), the new content may replace, be merged into, or be stored together with the old content. In some examples, if the template specifies the proper placement of the content, it may be placed in the proper order in the electronic content immediately, or may be placed later either automatically by using the template or manually.

In some examples, at operation 2060, the system may generate a report or notification identifying any missing assets or any additional asset requests that may be necessary. In some examples these may be the same reports or notifications as generated by quality assessment component 1080 of FIG. 1A. These reports or notifications may consider the template (or an outline of the content) to assess whether the project is complete or waiting on additional pieces. If there are unsubmitted pieces, a new asset request for missing content portions may be generated and sent to a content creator as already described. If an asset request has already been issued, a reminder message may be generated to remind the user to submit the assets. These reports may be set to run on a periodic basis, may be run on demand, and/or may run once new content is added.

As already noted, other methods of adding content to a content work may include a contributor using content tools 1045. The content tools 1045 may allow the user to associate the created content with an asset request, and may automatically coordinate with the asset management component 1050 to submit the created content, version the content, and the like.

Figure 3:
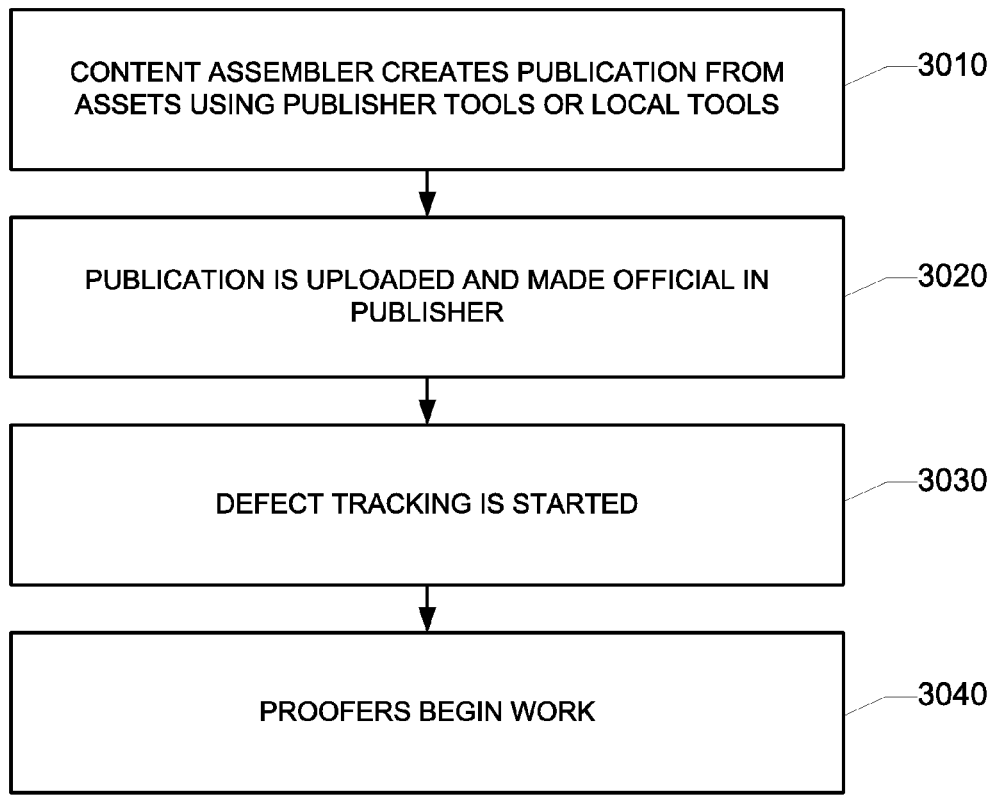
FIG. 3 shows a flowchart of a method of electronic content creation and management, according to some examples of the present disclosure.

Turning now to FIG. 3, when the contribution stage of the project is complete as determined either automatically by comparison between the submitted content and the template, or by a project manager or other user, either the system 1000 or a contributor may assemble the content in operation 3010 into a draft of the electronic content. In some examples this may be done based upon a table of contents. Once the content is assembled, the content may be uploaded or registered into the content management component 1060 at operation 3020 and defect tracking may begin at operation 3030. In some examples, the content management component 1060 may be integrated with the asset management component 1050, and in some examples, the defect tracking may begin before the first draft of the complete content is created. At this point, in some examples, the editors, proofers or other content contributors may begin the process of proofing the content at operation 3040.

Figure 4:
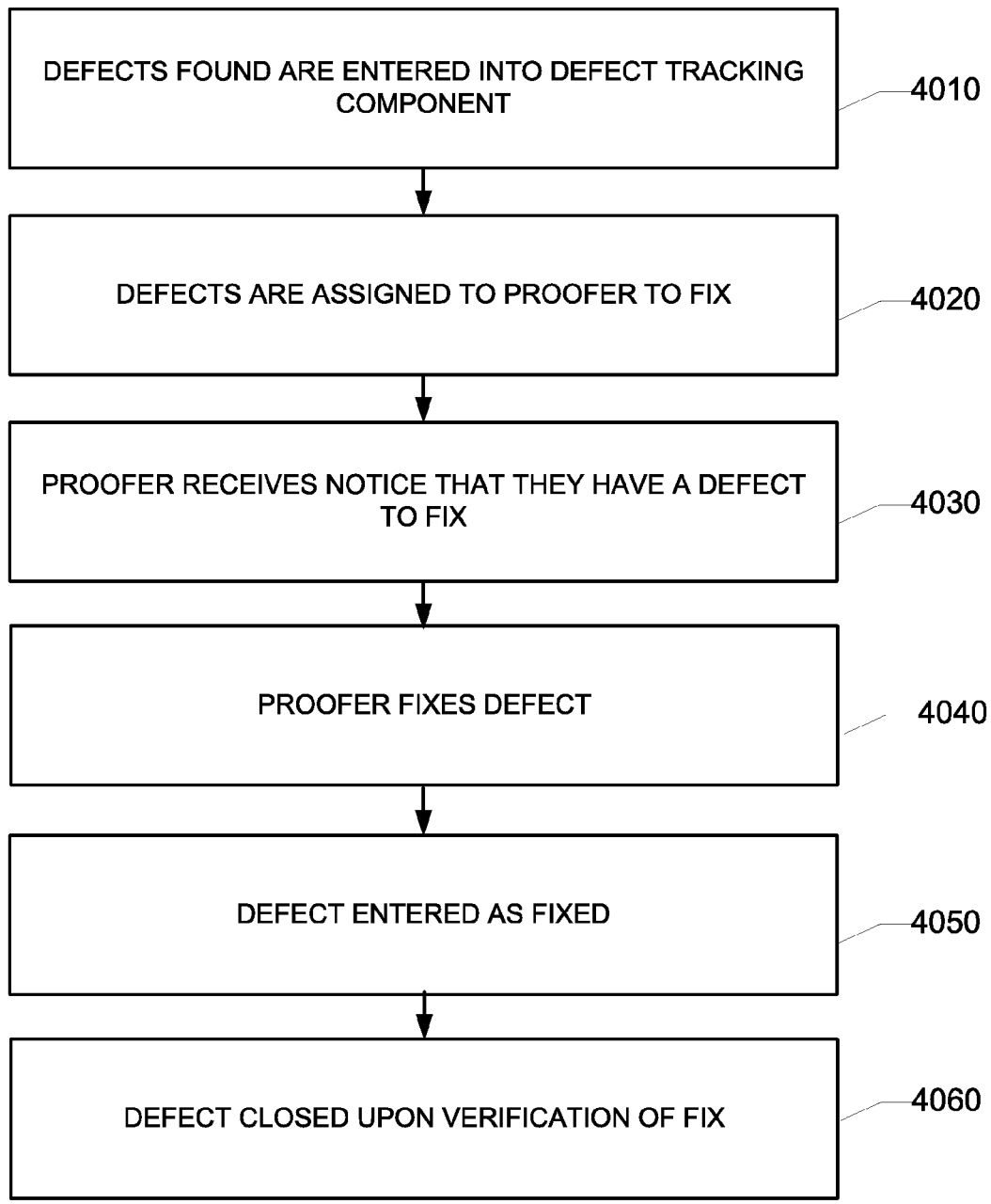
FIG. 4 shows a flowchart of a method of electronic content management, according to some examples of the present disclosure.

Turning now to FIG. 4, proofers may begin checking the content for defects. Once defects are found, they may be entered into the defect tracking component 1070 at operation 4010. Defects may be associated with any particular object in the electronic content. For example, defects may be associated with a letter, punctuation mark (or lack of a punctuation mark), a word, a phrase, a sentence, or any other portion of text. Defects may be associated with any portion of audio, audiovisual, or visual content. Defects may be associated with formatting, links, or any other aspect of the electronic content. Defects may also be associated with particular screen coordinates in the content. A defect reported to the system may have an associated defect record which may describe the defect. Fields included in the defect record may include a description of the defect, the type of defect, the name of the user who found the defect, the name of the user assigned to fix the defect, the version of the content when the defect was discovered as tracked by the content management system, the version of the content when the defect was fixed as tracked by the content management system, the time and date the defect was found, the time and date the defect was assigned, the time and date the defect was fixed, the time and date the defect was closed, a defect location identifier that points to or identifies the location of the defect in the content, the severity of the defect, a defect state, and the like. The defect record may also contain the entire discourse surrounding the issue. For example, the defect record may contain user comments and discussions about the issue. In some examples, the defect location identifier may associate the defect with particular text, graphics, or other elements of the electronic content. In other examples, the defect location identifier may be associated with one or more (x,y) screen coordinate locations within a particular portion of the electronic content such that the defect may not be related to a particular text or graphics portion, but rather a particular location within the electronic content. The screen coordinates may be absolute coordinates (e.g. the particular coordinates the defect relates to on a particular device), or relative coordinates (e.g., coordinates relative to a coordinate space defined by the particular content portion). The defects, when displayed with the content, may appear to be floating above the content.

In some examples, the defect tracking component 1070 may allow for conversations between one or more contributors regarding the defect. This may allow for various contributors to ask questions, provide clarification, status, or provide or receive instructions and help from other contributors. For example, the contributor who is to fix the defect may ask for clarification on details of the defect from the contributor who raised the defect. These conversations may be stored in the defect record, or may be tracked independently by the system 1000 or the defect tracking component 1070 and linked to the defect. These conversations may then be accessed by the various contributors from either the defect tracking component 1070 interface, or from within the electronic content itself. In some examples, the conversations and/or other information on the defect may be integrated into the content in such a way as to present readers and viewers of the electronic content with an indication that there is a conversation about a particular defect at the particular location they are viewing. In some examples, this can be done through modification of the font, text color, style or other attribute of the content, or by noting the defect in a margin, or off to the side, of the content along with one or more notifications regarding the conversation about the defect. Thus for example, the conversation may appear as a series of one or more notes or boxes appearing in the margins.

Defects entered into the system may be assigned to a content contributor, such as an editor, to fix the defect at operation 4020. In some examples, each contributor to which defects may be assigned may have a defect queue, where defects awaiting correction are held. As already noted, assignment may be done manually by a project manager or other user, or may be done automatically based on a variety of factors such as specialties and the like. At operation 4030 the notice may be sent to the proofer or other contributor that a defect was assigned to that individual. The notification may be a text message, a notification in integration component 1040, an email, or the like. The notification may contain a notification that a new defect was assigned to that user and may contain information on the defect. In some examples the notification may contain a link (e.g. hyperlink, etc.) to the defect tracking interface of integration component 1040 so the user may simply click to be taken to information about the defect in integration component or the defect tracking component. In other examples, the defect notification link may allow the editor or other individual to open the content editing tools integrated with, or linked from, integration component 1040 and load in those editing interfaces the content stored in content management component 1060 which contains the defect so that the user may begin work fixing the defect.

The proofer or other individual to whom the defect is assigned may then utilize the content tools 1045 integrated with, or linked from, integration component 1040 to fix the defect at operation 4040. Content tools 1045 integrate with content management component 1060 to handle version and access control. As already noted, content tools 1045 may allow contributors to change the version of the electronic content they are viewing or editing (e.g., via a drop down box or forward/back arrows) in order to view other changes made or to ascertain when and how the defect was introduced. Upon fixing the defect, the private copy may replace the copy stored in content management component 1060, or the private copy may be stored along with the copy in content management component 1060 or may be merged with the copy in content management component 1060 as previously explained.

In some examples, once the defect has been fixed, the individual who fixed the defect may update the status of the defect to indicate that the defect has been fixed at operation 4050. In some examples, the individual who fixed the defect (e.g., the proofer) may mark the defect as closed. In some examples, the defect must be verified as fixed by a different contributor at operation 4060. For example, the user who opened the issue may be notified that the issue has been fixed and the defect may be reassigned to that user to verify that the fix has been made. A link may be included in the notification and when the user opens the link, they will be presented with the content portion to verify that the fix was made. In some examples, this includes the ability to pull up the version of the content that had the defect in it to be able to compare the content pre-fix and post-fix. Once the user verifies that the fix is correct, the defect may be closed.

Figure 5:
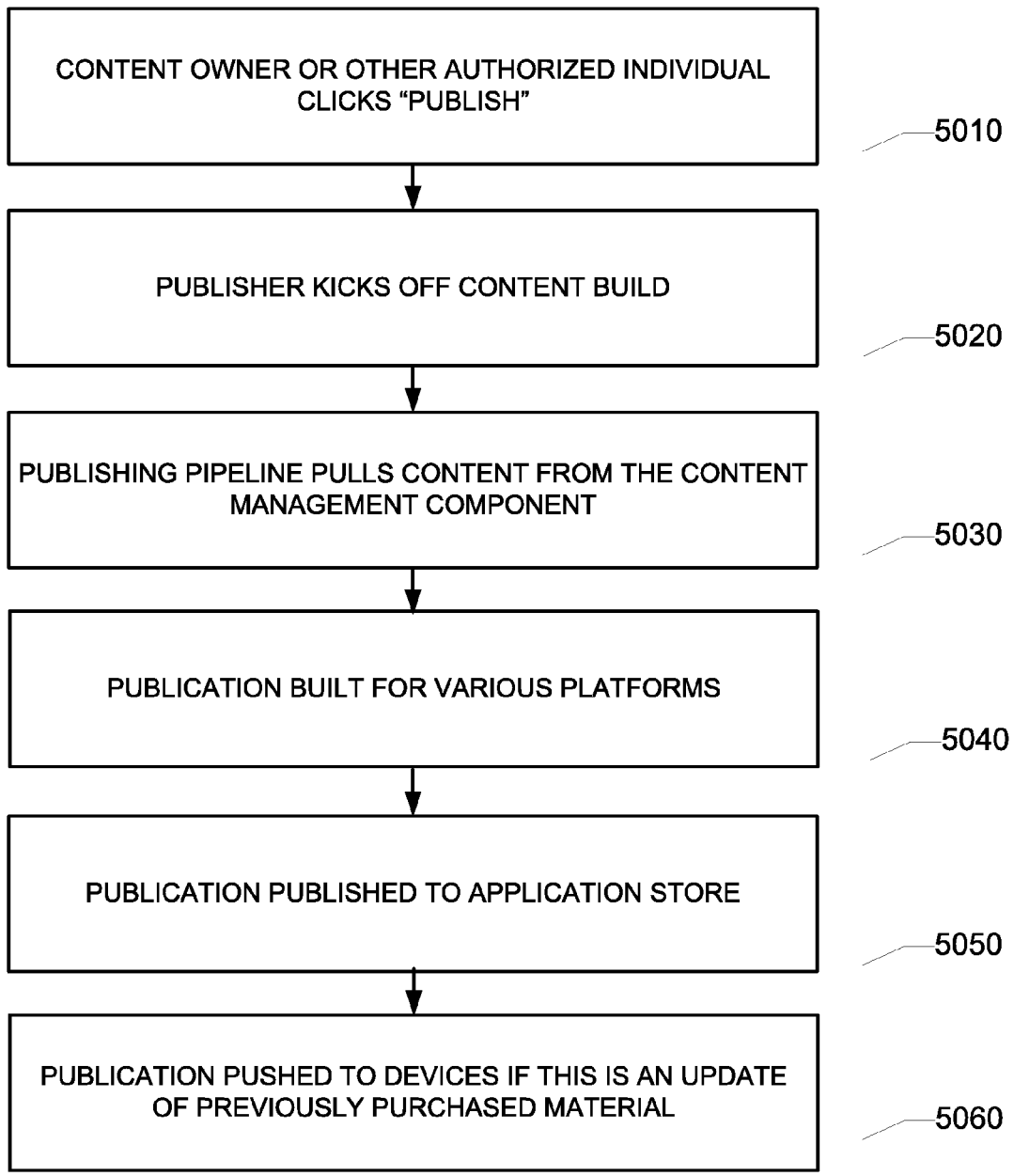
FIG. 5 shows a flowchart of a method of electronic content publication, according to some examples of the present disclosure.

Turning now to FIG. 5, when the decision is made to publish the electronic content to electronic store 1100 or directly to users 1110 through a push operation, the user kicks off the publication of the content from integration component 1040 at operation 5010. Integration component 1040 may then interface with the publishing pipeline 1090 or other components to begin the content build at operation 5020. The content build transforms the content from an electronic device independent format into a format that is renderable by the target electronic device or displayed on a desired media such that the content is displayed in a manner intended to convey the information, experiences, and idea expressions which may provide value for an end user.

In some examples, the publishing pipeline 1090 may pull the electronic content from the content management component 1060 at operation 5030. The publishing pipeline 1090 may then begin building the content from content management component 1060 for the desired electronic platforms at operation 5040. In some examples, the electronic content may be built for all supported devices and/or media. In other examples, the build may be done for only selected devices and/or media.

In some examples, at operation 5050, the electronic content may be posted to the electronic store for users 1110 to view, purchase, and download. In some examples, the entire electronic content may be offered for download, but in other examples, users may purchase only certain sections (e.g., units, chapters, or the like). At operation 5060, users who have previously downloaded an earlier version of the content may have a published update automatically "pushed" to their devices.

The integration component 1040 component may provide one or more graphical user interfaces which may integrate content and data from the various other system components.

Integration component may provide an overview of projects to which users are interested in following through a dashboard interface.

Figure 6:
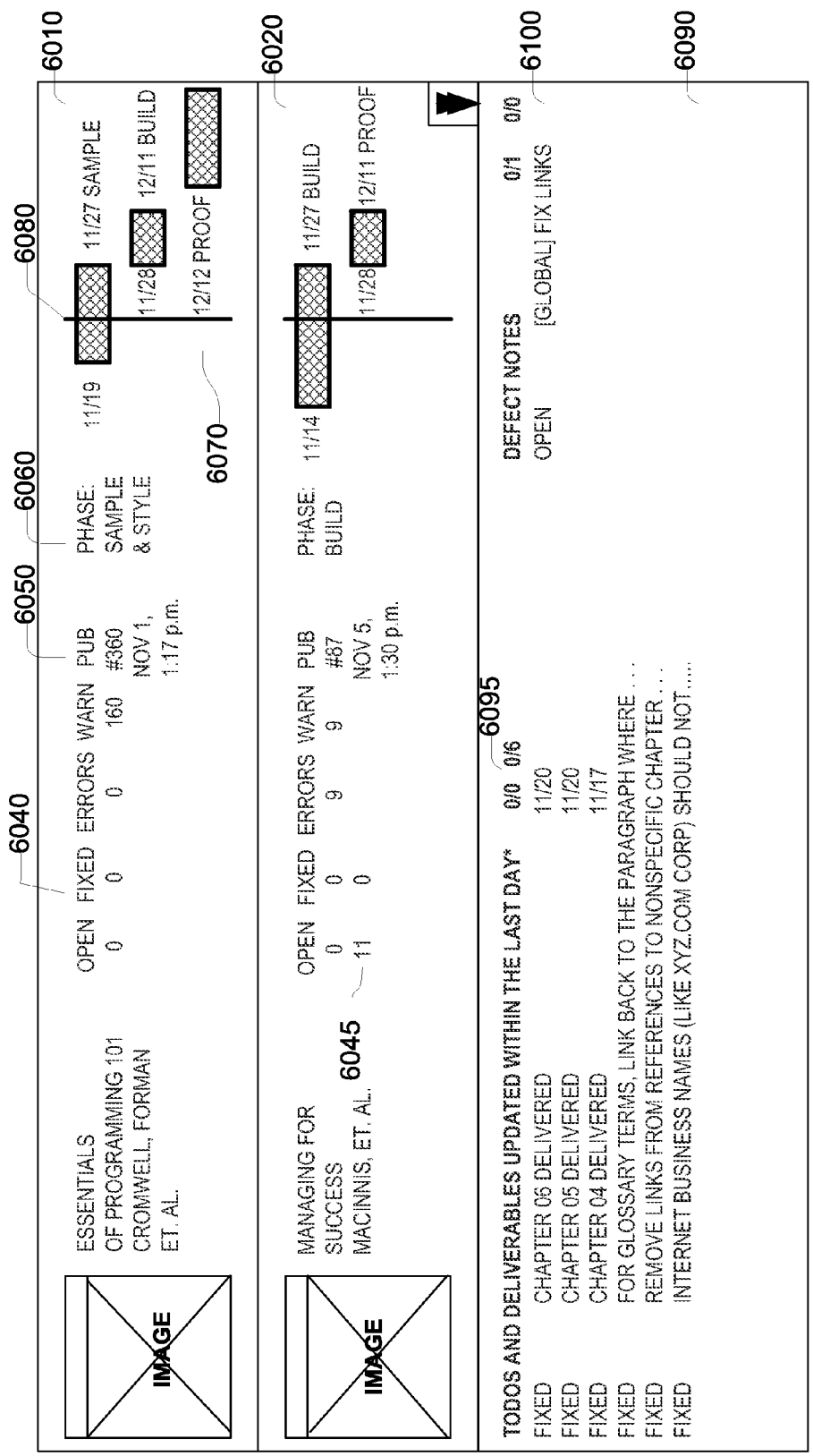
FIG. 6 shows a graphical user interface, according to some examples of the present disclosure.

FIG. 6 shows an example graphical user interface of a project management dashboard 6000. The status of each of the electronic content works is shown at 6010 and 6020. For each work, the number of open and fixed defects as well as the number of outstanding errors and warnings generated by the quality assessment component assigned to the user viewing the dashboard is shown at 6040. At 6045, the number of open defects and fixed defects in the project (e.g., the total number) may also be shown. The information on the last time the content work was published is shown at 6050 (e.g., the published version number and the time that version was published). The current phase of the project is shown at 6060. A Gantt chart is shown at 6070 which shows the start dates and end dates of one or more phases of the project along with a vertical line 6080 which represents the current date. In some examples each progress bar of each phase may be have an indicator within it that shows exactly how far along that phase is (e.g., if live out often deliverables have been delivered, the indicator would be half-way along the progress bar). Users may then compare the indicator of each phase with the line showing the current date to get an up-to-date indication of whether a phase is on schedule, behind schedule, or ahead of schedule.

At 6090 one of the projects has been expanded to show additional detail. The items shown in the additional detail section may be customized by the user to show the information the user would like to see. This may be done by specifying one or more search queries and/or filters to the various components that make up the system. For example, the user may include information from the defect tracking system such as a list of defects (shown as notes), a count of the number of defects, a breakdown of editors and their workloads, or the like. The user may also see a list of to-dos, deliverables, or the like from the project management component. The user may see information on when the electronic content was last published and for what formats. The user may also see statistics on distribution (e.g., how many downloads, how many devices an update was pushed to, and the like). The user may also see various information on the asset management system such as a list of missing assets, statistics on the assets (e.g., number of submitted, number of outstanding, and the like), workloads of the contributors, or the like. The additional detail may include any information managed by the system. In FIG. 6, the additional detail includes the status of the various deliverables and to-dos of the current phase (FIG. 6 shows the status of the deliverables and to-dos as "FIXED", with the date of completion 11/20, 11/20, 11/17 next to those deliverables). Also shown at 6095 is the number of to-dos and deliverables in this phase that are currently open and assigned to this user (0), the number of deliverables and to-dos currently open and assigned to all users in this phase (0), the total number of to-dos and deliverables in this phase fixed by this user (0), and the number of to-dos and deliverables in this phase that have been fixed by all users (6). At 6100, a custom filter is shown which displays all defect notes with the "[GLOBAL]" tag in the note text. Also shown is the total number of open defect notes assigned to this user in this phase, the number of open defect notes assigned to other users in this phase (1), the number of defects fixed by this user in this phase (0), and the number of defects fixed by all users in this phase (0). Clicking on a title may take a contributor to the home screen for a particular title. In yet other examples, the additional detail may include the displaying of activity around the content (e.g., a stream of changes related to issue fixes, content saves, comments, automated QA reports, last publish, or the like).

Figure 7A:
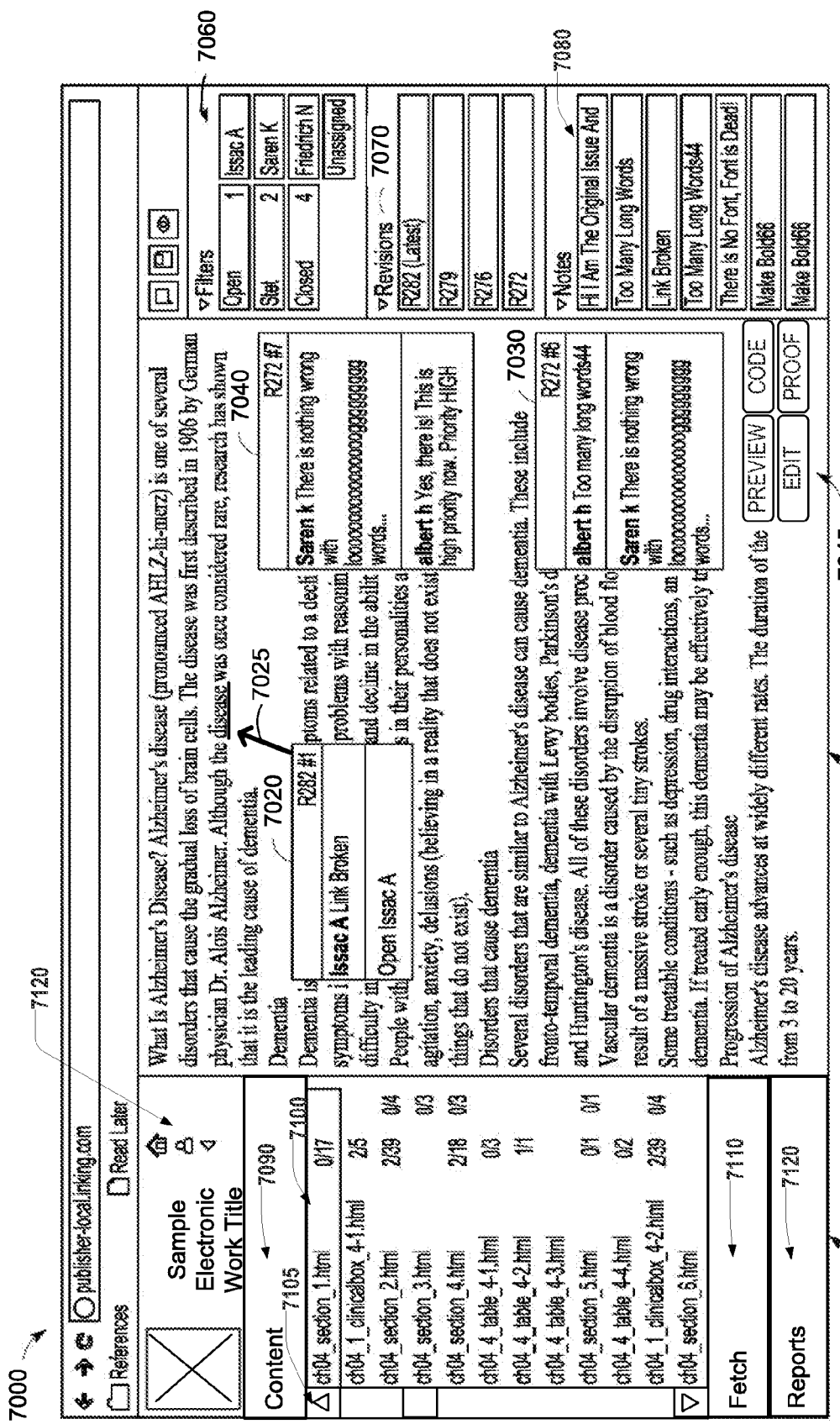
FIG. 7A shows a graphical user interface, according to some examples of the present disclosure.

Within a project, the integration component may present users with an integrated graphical user interface, or home screen. Content tools 1045 may be integrated with the home screen. FIG. 7A shows an example of a home screen graphical user interface 7000. On the left hand side of the screen are selectable tabs 7090, 7110 and 7120 which allow a contributor to select between viewing content portions, searching (or fetching) content portions, and viewing reports. In this example, the content tab 7090 is selected and expands to show the available content portions for viewing. In FIG. 7A, the selected portion 7100 ("ch04_section_1.html") of the content 7010 is displayed in the middle of the screen. The content portions may be displayed using the content tools 1045. Selecting the fetch tab 7110 or the reports tab 7120 may collapse the display of the available content portions and display fetch or report specific information. Each section under the content tab 7090 is also displayed with defect counts corresponding to each section. The section shows the number of open defects assigned to that particular user vs. the total number of open defects, along with the number of fixed defects assigned to this user in that section and the total number of fixed defects in that section. For example, for this particular contributor, for ch04_section 2.html, this user has two defects assigned to him/her, and there are a total of 39 outstanding defects. Additionally, there have been four previously fixed defects in this section, of which none were fixed by this user. In some examples, if there are more content portions that can fit into the content tab 7090, a user may utilize a scroll bar (such as scroll bar 7105) to see additional content portions.

In the content display 7010, defect notes 7020, 7030, and 7040 associated with this portion of content for this version are shown integrated with the content 7010. Each note may present information from the defect record to which the note is associated, including a history of each contributor's comments about the defect (in some examples, organized as a conversation) and any state or assignment changes that have taken place. The notes can include file attachments, code snippets, and arrows or highlights pointing to the content and regarding the defect. For example, note 7020 includes an arrow 7025 drawn to a particular piece of the content. Notes may be anchored to selected content (e.g., text, graphics, videos, and the like), but also may be anchored on particular (x,y) coordinates of the content. If the content is video content or other content with multiple frames, each note may also specify a particular frame to which it applies. In addition, the notes may be grouped together or labeled so as to identify patterns or to allow changing the defect information of multiple defects at the same time (e.g. mass reassignment of defects). Selecting or clicking on a note may take the user to a detailed view of additional meta-data associated with the defect.

View selection buttons 7045 allow contributors to shift between different views or modes. The preview mode activates the simulator which shows the user the way the electronic content looks and acts on a selected target device (e.g., an iPad). Animations, graphics, videos and the like appear and behave as if they were executing natively on the target device. The code mode shows the underlying source code of the content (if any). For example, if the content is stored as an XML file, the underlying XML is displayed. In some examples, users may edit the XML documents within this view. The edit mode active the integration component's inline content viewer and editors. These inline editors may include a WYSIWYG ("what you see is what you get") editor which may be an editing interface in which the content displayed on the screen during editing appears in a form closely corresponding to its appearance on the target device. Users may drag and drop visual elements, text boxes, and the like. The proof mode enables proofers and other editors to quickly proof all content. Proof mode is similar to preview mode except that proof mode expands and displays any hidden content and allows for proofers or other contributors to identify and raise defects by adding notes. Content may be hidden for example as answers to a quiz question, hints to a quiz answer, or the like. During proof mode, these may automatically be shown.

At the right side of the screen, a number of selectable filters are shown at 6060. These filters allow a contributor to show only a subset of the issues based on status or assignee, or other like criteria. Also at the right side of the screen a number of revisions are selectable at 7070. The system may track multiple versions of the content at once and track defects with respect to these versions. A contributor or other user may view an earlier version to view the defect in context and then move to a later version to verily that it has been fixed. As each version is browsed, the defect notes may change based on the defects in that version (i.e., a defect introduced in version 5 will not be visible when version 3 is selected—likewise a defect in version 3 that is fixed in version 5 will not be visible when viewing version 5). This is the result of the integration between the content management component 1060, the defect tracking component 1070, and integration component 1040. For example, upon selecting a previous version, the integration component 1040 contacts the content management component 1060 to request the previous version of the content. Upon receiving the previous version of the content, integration component 1040 may contact the defect tracking component to retrieve defects associated with that version. Finally, integration component 1040 may display the particular version of the content and the associated defects. Notes on the current page are also listed on the right hand side of the screen at 7080 for convenience. Icons 7120 may take contributors back to the dashboard, take the contributors to a preferences screen or the like. In some examples, contributors may create new content portions by left clicking on the list of content portions in the content tab 7090. A blank content portion may be displayed in the window 7010 and subsequently edited using the content tools 1045.

Figure 7B:
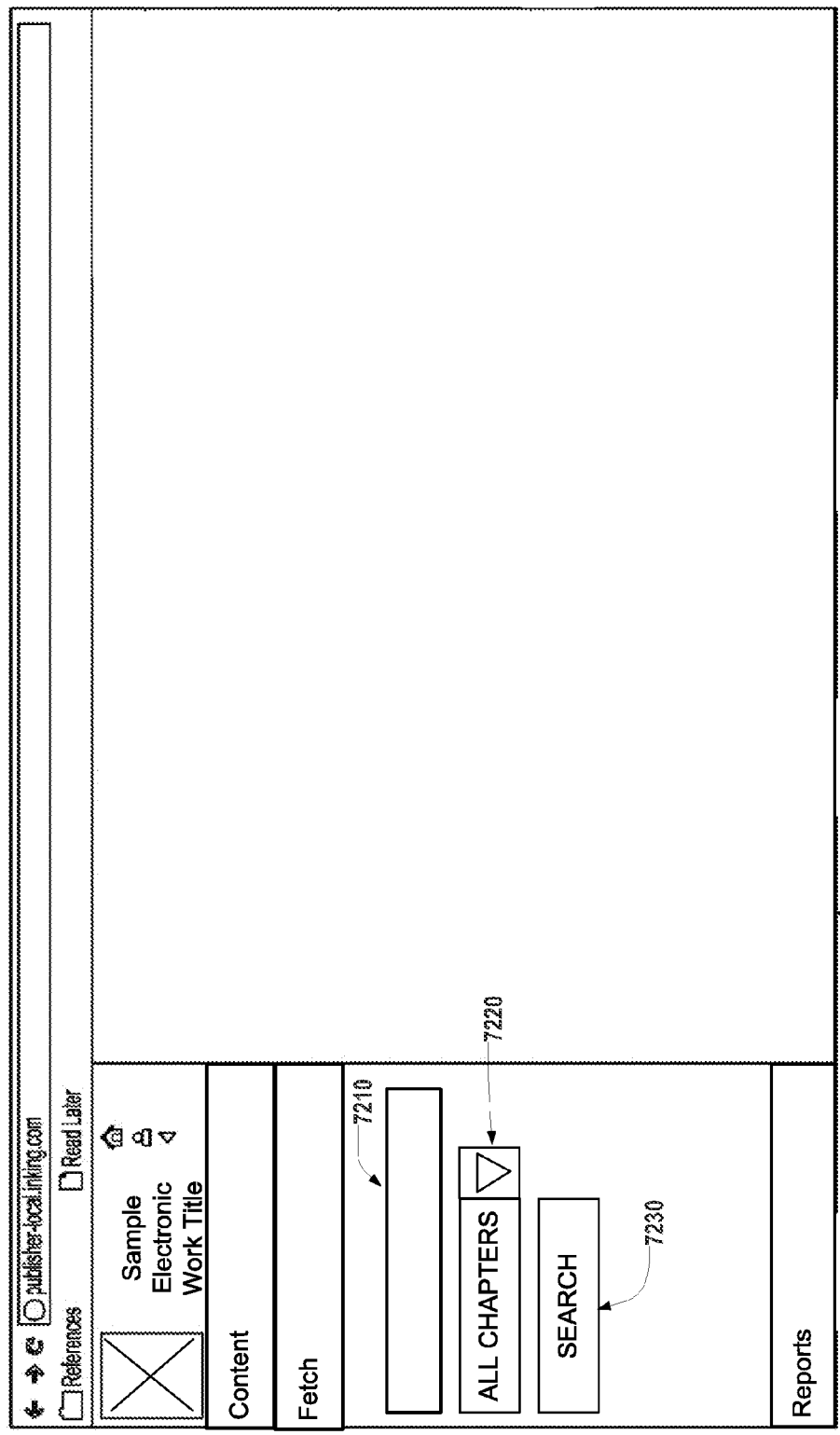
FIG. 7B shows a graphical user interface, according to some examples of the present disclosure.

Selecting tab 7110 brings up a search screen which may allow a user to "fetch," one or more content portions. This may be useful for horizontal proofing—which is where a proofer checks all content of a certain type (e.g., all "aside" boxes). An example fetch interface is shown in FIG. 7B. A search box is shown at 7210. In some examples, this search box accepts an XML element and the fetch will return any content which matches that XML element (e.g., entering 'h1' may display all the 'h1' elements). In other examples, the search box may be a free text search. In yet other examples, the search may be based upon cascading style sheet (CSS) selectors. These selectors may be in the form "tagname.classname" where tagname is the first word after the opening caret ('<') in html (or some other markup) and classname is a word inside the class="<word>" html attribute. Multiple selectors separated by spaces may be used to scope the query. For example, if you wanted to query only aside elements inside paragraph tags, you could use: "p aside". The search may be on the content itself, or on the underlying code (e.g., the markup tags) or both. In yet other examples, the search terms may include searches related to data from the defect tracking tool. Thus a search may be created which would show all "figure" tags that have open defects or all "H1" tags that have open defects assigned to a particular user. Additionally, data from the content management tool may be searched as well. For example, the search results may be limited based upon the content version. Furthermore, the quality assessment component 1080 may be used as an input into the search. For example, content with defects found by the quality assessment component may be shown. Thus entering a specific search term may show results related to that search.

In still other examples, the search box may present a visual search interface which recognizes concepts as you type and allows you to select from a drop-down box a list of possible choices for those concepts. For example, entering "country" into the search box is recognized as a search regarding a particular country and the drop-down box may provide a list of countries from which to choose and search results are confined to that particular country. In some examples, the fetch interface may return results from the entire content work, but in other examples the results may be confined to one or more sections (e.g., chapters, units, or the like) by utilizing the drop down box 7220 to select one or more sections. In yet other examples, the visual search box may allow users to confine the search results to particular sections (e.g., typing in chapter may bring up a drop-down box with a list of chapters). Matching content portions may be displayed in the content pane 7240. In some examples, this may be a list of matching content, but in other examples the matching content may be displayed as a carousel where one or more inputs (e.g. a touch gesture or mouse input) may select between the various content portions. For example, to move between the first match and the second match a user may swipe the content portions. In some examples, the content in pane 7240 may be editable using integrated content tools 1045. In some examples, this may allow a user to quickly view all content of certain types for easy proofing and consistency checking (e.g., horizontal proofing). Defects may also be opened in the content pane 7240 (e.g., by right clicking or left clicking a particular portion of content and selecting an open defect option of a context sensitive menu). In some examples, the search results returned may show the open defects.

FIG. 8 shows an example user interface 8000 showing an example link validation quality report 8005 run by the quality assessment component 1080. In some examples a contributor may access this user interface by clicking on the reports tab 7120 in the graphical user interface of FIG. 7A. The report shows a breakdown for each section of the content of errors or other anomalies found in the section as well as information on where the error or anomaly is in the section. The report may find errors (e.g. issues that are definitively wrong such as broken links), warnings (issues that are likely wrong but may require judgment—e.g., word was not found in the dictionary), and informational issues (issues that may or may not be a problem—e.g. additional whitespaces or non-ASCII characters).

In some examples, reports may be ran for each new version of the content and the reports for each version may be viewable to allow for easy diagnosis of when an error was introduced. For example, in the GUI shown in FIG. 8, a user may select a report for an earlier (or later) report using a pull down menu 8010. On the left side of the screen, navigation bar 8020 shows a summary of the different available reports and the number of errors and warnings for each report. FIG. 8 currently shows a number of link validation errors indicating issues with various links throughout the content. A report heading 8030 indicates that there are eleven link errors, 24 link warnings and 112 informational issues. Selecting a different type of validation issue (e.g. table of content errors)

through navigation bar 8020 would pull up the validation report for those issue types similarly. Selecting one of the displayed errors, warnings, or other findings may display additional meta-data related to the error or warning, or may jump to a view of the content or code which generated the error, warning, or the like.

Figure 9:
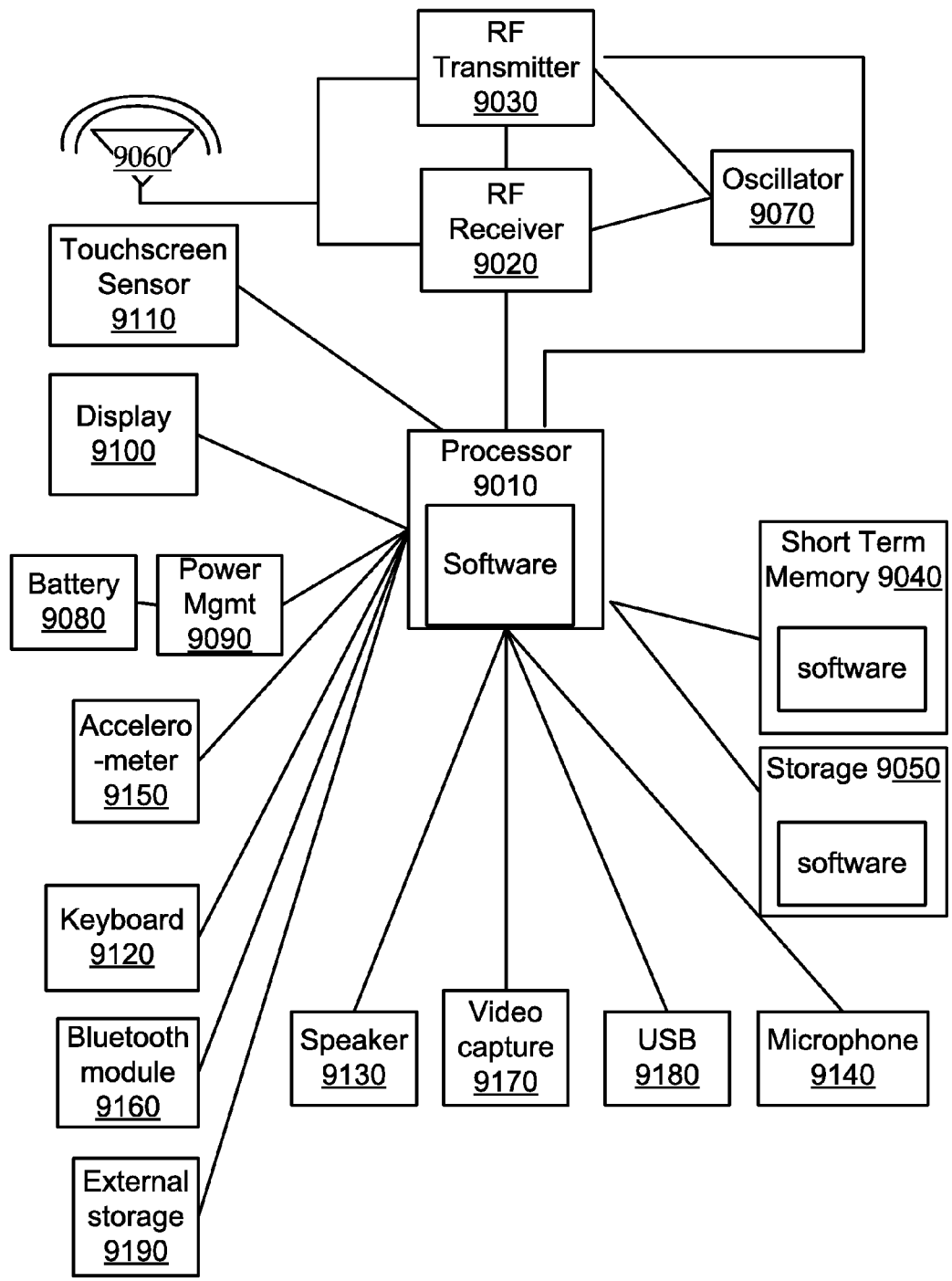
FIG. 9 shows a schematic of an electronic device, according to some examples of the present disclosure.

Publishing pipeline 1090 may build the electronic content for various electronic devices. Electronic devices may include any electronic device capable of processing the renderable electronic content and displaying it so as to properly convey the information, experiences, and idea expressions which are embodied in the electronic representation of the content in order to provide value for an end user. Examples of electronic devices include desktop computers, laptop computers, server computers, cellphones, smart phones, tablet computers, computer game consoles, portable computer gaming consoles, media players, portable media players, other mobile devices, and the like. FIG. 9 shows one example of such a device 9000 in the form of an electronic device. Processor 9010 controls the overall functions of the electronic device such as running applications and controlling peripherals. Processor 9010 may be any type of processor including RISC, CISC, VLIW, MISC, OISC, and the like. Processor 9010 may include a Digital Signal Processor ("DSP"). Processor 9010 may communicate with RF receiver 9020 and RF transmitter 9030 to transmit and receive wireless signals such as cellular, Bluetooth, and Wi-Fi signals. Processor 9010 may use short term memory 9040 to store operating instructions and help in the execution of the operating instructions such as the temporary storage of calculations and the like. Processor 9010 may also use non-transitory storage 9050 to read instructions, files, and other data that requires long term, non-volatile storage.

RF Receiver 9020 and RF Transmitter 9030 may send signals to the antenna 9060. RF transmitter 9030 contains all the necessary functionality for transmitting radio frequency signals via antenna 9060 given a baseband signal sent from Processor 9010. RF transmitter may contain an amplifier to amplify signals before supplying the signal to antenna 9060. RF transmitter 9030 and RF Receiver 9020 are capable of transmitting and receiving radio frequency signals of any frequency including, microwave frequency bands (0.3 to 70 GHz) which include cellular telecommunications, WLAN and WWAN frequencies. Oscillator 9070 may provide a frequency pulse to both RF Receiver 9020 and RF Transmitter 9030.

Device 9000 may include a battery or other power source 9080 with associated power management process or module 9090. Power management module 9090 distributes power from the battery 9080 to the other various components. Power management module 9090 may also convert the power from battery 9080 to match the needs of the various components. Power may also be derived from alternating or direct current supplied from a power network.

Processor 9010 may communicate and control other peripherals, such as LCD display 9100 with associated touch screen sensor 9110. Processor 9010 causes images to be displayed on LCD display 9100 and receives input from the touch screen sensor 9110 when a user presses on the touchscreen display. In some examples touch screen sensor 9110 may be a multi-touch sensor capable of distinguishing, and processing gestures.

Processor 9010 may receive input from a physical keyboard 9120. In other examples, the electronic device 9000 may utilize a touch screen keyboard using LCD display 9100 and touch screen sensor 9110. 9010 may produce audio output, and other alerts which are played on the speaker 9130. Speaker 9130 may also be used to play voices (in the case of a voice phone call) that have been received from RF receiver 9020 and been decoded by Processor 9010. Microphone 9140 may be used to transmit a voice for a voice call conversation to processor 9010 for subsequent encoding and transmission using RF Transmitter 9030. Microphone 9140 may also be used as an input device for commands using voice processing software. Accelerometer 9150 provides input on the motion of the device 9000 to processor 9010. Accelerometer 9150 may be used in motion sensitive applications. Bluetooth module 9160 may be used to communicate with Bluetooth enabled external devices. Video capture device 9170 may be a still or moving picture image capture device or both. Video Capture device 9170 is controlled by Processor 9010 and may take and store photos, videos, and may be used in conjunction with microphone 9140 to capture audio along with video. USB port 9180 enables external connections to other devices supporting the USB standard and charging capabilities. USB port 9180 may include all the functionality to connect to, and establish a connection with an external device over USB. External storage module 9190 may include any form of removable physical storage media such as a flash drive, micro SD card, SD card, Memory Stick and the like. External storage module 9190 may include all the functionality needed to interface with these media.

Certain embodiments are described herein as including logic or a number of components, modules, or mechanisms. Modules or components may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).) Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC). The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 10:
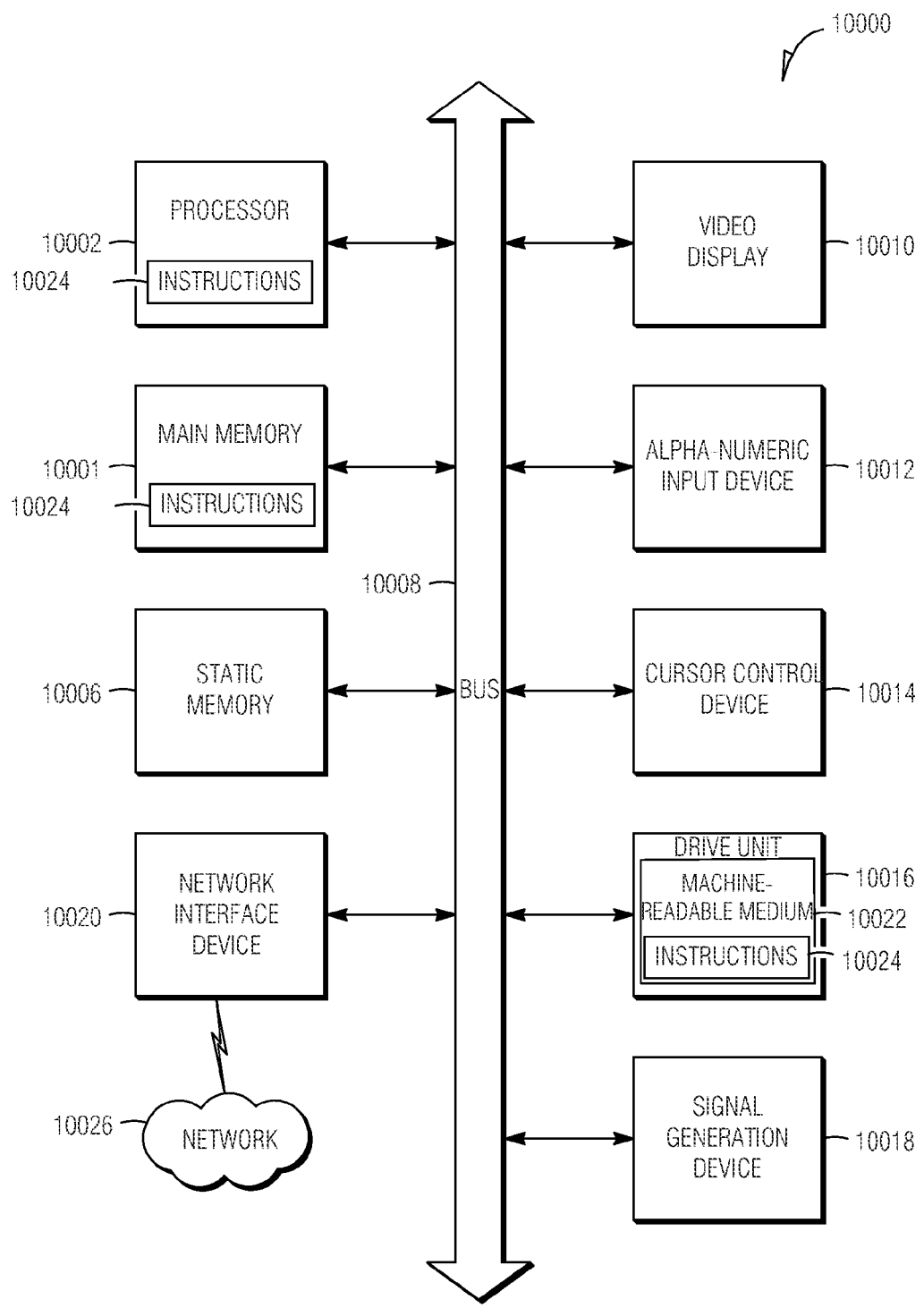
FIG. 10 shows an example of a machine, according to some examples of the present disclosure.

FIG. 10 shows a diagrammatic representation of a machine in the example form of a computer system 10000 within which a set of instructions for causing the machine to perform any one or more of the methods, processes, operations, or methodologies discussed herein may be executed. In some examples, the computer system 10000 may be or include components from the example device 9000. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a tablet PC, a Set-Top Box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments may also be practiced in distributed system environments where local and remote computer systems which that are linked (e.g., either by hardwired, wireless, or a combination of hardwired and wireless connections) through a network, both perform tasks. In a distributed system environment, program modules may be located in both local and remote memory-storage devices (see below).

The example computer system 10000 includes a processor 10002 (e.g., a Central Processing Unit (CPU), a Graphics Processing Unit (GPU) or both), a main memory 10001 and a static memory 10006, which communicate with each other via a bus 10008. The computer system 10000 may further include a video display unit 10010 (e.g., a Liquid Crystal Display (LCD) or a Cathode Ray Tube (CRT)). The computer system 10000 also includes an alphanumeric input device 10012 (e.g., a keyboard), a User Interface (UI) cursor controller 10014 (e.g., a mouse), a disk drive unit 10016, a signal generation device 10018 (e.g., a speaker) and a network interface device 10020 (e.g., a transmitter).

The disk drive unit 10016 includes a machine-readable medium 10022 on which is stored one or more sets of instructions 10024 and data structures (e.g., software) embodying or used by any one or more of the methodologies or functions illustrated herein. The software may also reside, completely or at least partially, within the main memory 10001 and/or within the processor 10002 during execution thereof by the computer system 10000, the main memory 10001 and the processor 10002 also constituting machine-readable media.

The instructions 10024 may further be transmitted or received over a network 10026 via the network interface device 10020 using any one of a number of well-known transfer protocols (e.g., HTTP, Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any of the one or more of the methodologies illustrated herein. The term "machine-readable medium" shall accordingly be taken to include, but not be limited to, solid-state memories, and optical and magnetic medium.

Method embodiments illustrated herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, Random Access Memories (RAMs), Read Only Memories (ROMs), and the like.

Disclosed in some examples are systems, methods and machine readable media for the management of content creation. In some examples the system includes a content management component configured to store portions of an electronic content work and to implement version control of the electronic content work; a defect tracking component configured to store a defect record related to a stored portion of the electronic content work; a publication pipeline component configured to format the electronic content work for publication; and a integration component configured to present a graphical user interface which allows for editing the stored portions of the electronic content work, editing the defect record, and instructing the publication pipeline to format the electronic content work for publication.

These examples can be combined in any permutation or combination. This overview is intended to provide an overview of subject matter of the present patent application. It is not intended to provide an exclusive or exhaustive explanation of the invention. The detailed description is included to provide further information about the present patent application.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description.

The Abstract is provided to comply with 37 C.F.R. §1.72 (b), to allow the reader to quickly ascertain the nature of the technical disclosure. It is submitted with the understanding that it will not be used to interpret or limit the scope or meaning of the claims.

Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment.

The following are additional examples

Example 1

Is a system including a content management component configured to store portions of an electronic content work and to implement version control of the electronic content work; a defect tracking component configured to store a defect record related to a stored portion of the electronic content work; a publication pipeline component configured to format the electronic content work for publication; and an integration component configured to present a graphical user interface which allows for editing the stored portions of the electronic content work, editing the defect record, and instructing the publication pipeline to format the electronic content work for publication.

Example 2

The system of example 1, wherein the publication pipeline component is configured to format the electronic content work for publication by formatting the electronic content work for printing on paper.

Example 3

The system of any one of the previous examples, wherein the publication pipeline component is configured to format the electronic content work for publication by formatting the electronic content work for display on a first type of electronic device and format the electronic content work for display on a second type of electronic device.

Example 4

The system of any one of the previous examples, wherein the system comprises a distribution component which is configured to distribute, over a network, the formatted electronic content work to the first type of electronic device.

Example 5

The system of any one of the previous examples, wherein the system comprises a quality assessment component configured to analyze the stored portions of the electronic content work and generate a notification related to a status of one or more of the stored portions of the electronic content work.

Example 6

The system of any one of the previous examples, wherein the defect tracking component is configured to assign a responsibility for fixing a defect identified in the defect record to one of a plurality of defect queues associated with a user.

Example 7

The system of any one of the previous examples, comprising an asset management component configured to manage submission of one or more electronic content portions of the electronic content work and the integration component further configured to provide a plurality of users with access to the asset management component and the one or more submitted electronic content portions of the electronic content work.

Example 8

A method of creating electronic content, the method comprising: storing portions of an electronic content work; implementing version control of the electronic content work; storing a defect record related to a stored portion of the electronic content work; formatting the electronic content work for publication; and presenting a graphical user interface which allows for editing the stored portions of the electronic content work, editing the defect record, and instructing the publication pipeline to format the electronic content work for publication.

Example 9

The method of example 8, wherein formatting the electronic content work for publication comprises formatting the electronic content work for printing on paper.

Example 10

The method of any of the previous examples, wherein formatting the electronic content work for publication comprises formatting the electronic content work for display on a first type of electronic device and formatting the electronic content work for display on a second type of electronic device.

Example 11

The method of any of the previous examples, comprising distributing, over a network, the formatted electronic content work to the first type of electronic device.

Example 12

The method of any of the previous examples, comprising analyzing the stored portions of the electronic content work and generating a notification related to a status of one or more of the stored portions of the electronic content work.

Example 13

The method of any of the previous examples, comprising assigning a responsibility for fixing a defect identified in the defect record to one of a plurality of defect queues associated with a user.

Example 14

The method of any of the previous examples, comprising managing the submission of one or more electronic content portions of the electronic content work.

Example 15

A machine readable medium that stores instructions which when performed by a machine, cause the machine to perform operations comprising: storing portions of an electronic content work; implementing version control of the electronic content work; storing a defect record related to a stored portion of the electronic content work; formatting the electronic content work for publication; and presenting a graphical user interface which allows for editing the stored portions of the electronic content work, editing the defect record, and instructing the publication pipeline to format the electronic content work for publication.

Example 16

The machine-readable medium of example 15, wherein the instructions for formatting the electronic content work for publication include instructions, which when performed by the machine, cause the machine to: format the electronic content work for printing on paper.

Example 17

The machine-readable medium of any of the previous examples, wherein the instructions for formatting the electronic content work for publication include instructions, which when performed by the machine, cause the machine to: format the electronic content work for display on a first type of electronic device and format the electronic content work for display on a second type of electronic device.

Example 18

The machine-readable medium of any of the previous examples, wherein the instructions include instructions which when performed by the machine, cause the machine to: distribute over a network, the formatted electronic content work to the first type of electronic device.

Example 19

The machine-readable medium of any of the previous examples, wherein the instructions include instructions which when performed by the machine, cause the machine to: analyze the stored portions of the electronic content work and generate a notification related to a status of one or more of the stored portions of the electronic content work.

Example 20

The machine-readable medium of any of the previous examples, wherein the instructions include instructions which when performed by the machine, cause the machine to: assign a responsibility for fixing a defect identified in the defect record to one of a plurality of defect queues associated with a user.

Example 21

The machine-readable medium of any of the previous examples, wherein the instructions include instructions which when performed by the machine, cause the machine to: manage the submission of one or more electronic content portions of the electronic content work.

Thus, the following claims are hereby incorporated into the Detailed Description, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

What is claimed is:

1. A system comprising:
   a content management component configured to store one or more electronic content portions of a to-be-published electronic content work and to implement version control of the electronic content work;
   a defect tracking component configured to store defect records related to one or more of the stored content portions of the to-be-published electronic content work;
   a publication pipeline component configured to format and publish the electronic content work by converting format-independent representations of the content portions comprising the electronic content work to a plurality of format-dependent representations of the electronic content work, each format-dependent representation of the electronic content work suitable for a particular target rendering environment specified by a profile available to the publication pipeline component; and
   an integration component configured to present a user with a graphical user interface which allows for:
   (i) editing the stored content portions of the to-be-published electronic content work,
   (ii) editing the one or more defect records related to the one or more stored content portions of the to-be-published electronic content work, and
   (iii) instructing the publication pipeline to format the electronic content work for publication.

2. The system of claim 1, wherein the publication pipeline component is configured to format the electronic content work for publication by formatting the electronic content work for display on a first type of electronic device and format the electronic content work for display on a second type of electronic device.

3. The system of claim 2, wherein the system comprises a distribution component which is configured to distribute, over a network, an appropriate one of the format-dependent representations of the electronic content work to the first type of electronic device.

4. The system of claim 1, wherein the system comprises a quality assessment component configured to analyze the stored portions of the electronic content work and generate a notification related to a status of one or more of the stored portions of the electronic content work.

5. The system of claim 1, wherein the defect tracking component is configured to assign responsibility for fixing a defect tracked by one or more associated defect records stored by the defect tracking component to one of a plurality of defect queues associated with the user.

6. The system of claim 1, comprising an asset management component configured to manage submission of the one or more electronic content portions of the electronic content work and the integration component being further configured to provide a plurality of users with access to the asset management component and the one or more submitted electronic content portions of the electronic content work.

7. A method of creating electronic content, the method comprising:
   storing content portions of a to-be-published electronic content work;
   implementing version control of the electronic content work;

storing defect records related to one or more stored content portions of the to-be-published electronic content work; and presenting a graphical user interface which allows for editing the stored content portions of the to-be-published electronic content work, editing the one or more defect records related to the one or more stored content portions of the to-be-published electronic content work, and instructing a publication pipeline to format the electronic content work for publication by converting format-independent representations of the content portions comprising the to-be-published electronic content work to a plurality of format-dependent representations of the electronic content work, each format-dependent representation of the electronic content work suitable for a particular target rendering environment specified by a profile available to the publication pipeline.

8. The method of claim 7, wherein formatting the electronic content work for publication comprises formatting the electronic content work for display on a first type of electronic device and formatting the electronic content work for display on a second type of electronic device.

9. The method of claim 8, comprising distributing, over a network, an appropriate one of the format-dependent representations of the electronic content work to the first type of electronic device.

10. The method of claim 7, comprising analyzing the stored content portions of the electronic content work and generating a notification related to a status of one or more of the stored content portions of the electronic content work.

11. The method of claim 7, comprising assigning a responsibility for fixing one or more defects identified in one or more associated ones of the defect records to one of a plurality of defect queues associated with a user.

12. The method of claim 7, comprising managing submission of one or more of the content portions of the to be published electronic content work.

13. A non-transitory machine readable medium that stores instructions which, when performed by a machine, cause the machine to perform operations comprising:

storing content portions of a to-be-published electronic content work; implementing version control of the electronic content work;

storing defect records related to one or more stored content portions of the to-be-published electronic content work; and presenting a graphical user interface which allows for editing the stored content portions of the to-be-published electronic content work, editing the one or more defect records related to the one or more stored content portions of the to-be-published electronic content work, and instructing a publication pipeline to format the electronic content work for publication by converting format-independent representations of the content portions comprising the to-be-published electronic content work to a plurality of format-dependent representations of the electronic content work, each format-dependent representation of the electronic content work suitable for a particular target rendering environment specified by a profile available to the publication pipeline.

14. The non-transitory machine-readable medium of claim 13, wherein the instructions for formatting the electronic content work include instructions, which when performed by the machine, cause the machine to: format the electronic content work for display on a first type of electronic device and format the electronic content work for display on a second type of electronic device.

15. The non-transitory machine-readable medium of claim 14, wherein the instructions include instructions which when performed by the machine, cause the machine to: distribute over a network an appropriate one of the format-dependent representations of the electronic content work to the first type of electronic device.

16. The non-transitory machine-readable medium of claim 13, wherein the instructions include instructions which when performed by the machine, cause the machine to: analyze the stored content portions of the electronic content work and generate a notification related to a status of one or more of the stored content portions of the electronic content work.

17. The non-transitory machine-readable medium of claim 13, wherein the instructions include instructions which when performed by the machine, cause the machine to: assign responsibility for fixing one or more defects identified in one or more associated ones of the defect records to one of a plurality of defect queues associated with a user.

* * * * *